(12) United States Patent
Maeda

(10) Patent No.: US 7,603,188 B2
(45) Date of Patent: Oct. 13, 2009

(54) SERVO MOTOR CONTROL SYSTEM

(75) Inventor: Hiroyuki Maeda, Suntou-gun (JP)

(73) Assignee: OMRON Corporation, Kyoto (JP)

( * ) Notice: Subject to any disclaimer, the term of this patent is extended or adjusted under 35 U.S.C. 154(b) by 738 days.

(21) Appl. No.: 11/280,935

(22) Filed: Nov. 15, 2005

(65) Prior Publication Data

US 2006/0144187 A1    Jul. 6, 2006

(30) Foreign Application Priority Data

Nov. 17, 2004   (JP) ............................. 2004-332566
Nov. 14, 2005   (JP) ............................. 2005-329369

(51) Int. Cl.
    *G05B 19/18*    (2006.01)
    *G05B 13/00*    (2006.01)
(52) U.S. Cl. .................... 700/63; 318/560; 318/561; 318/578
(58) Field of Classification Search ................. 700/63; 318/569, 560, 561, 578
    See application file for complete search history.

(56) References Cited

U.S. PATENT DOCUMENTS

| | | | |
|---|---|---|---|
| 5,963,003 A | 10/1999 | Boyer | |
| 6,243,624 B1 * | 6/2001 | Wu et al. | 700/260 |
| 6,246,201 B1 * | 6/2001 | Aderek et al. | 318/632 |
| 6,275,778 B1 * | 8/2001 | Shimada et al. | 702/41 |
| 6,781,339 B1 * | 8/2004 | Ikeguchi | 318/569 |
| 2003/0159401 A1 * | 8/2003 | Sorenson et al. | 53/374.6 |
| 2004/0049302 A1 * | 3/2004 | Nagamatsu et al. | 700/73 |
| 2006/0055359 A1 * | 3/2006 | Akama | 318/569 |

FOREIGN PATENT DOCUMENTS

| | | |
|---|---|---|
| JP | 03-082390 | 8/1991 |
| JP | 2000-198094 | 7/2000 |

* cited by examiner

*Primary Examiner*—Ramesh B Patel
*Assistant Examiner*—Olvin Lopez
(74) *Attorney, Agent, or Firm*—Weacer Austin Villeneuve & Sampson LLP

(57) ABSTRACT

An electronic cam using a servo motor is controlled such that its motion including its acceleration will be connected between synchronized and non-synchronized control sections. A controlled object is moved at a fixed speed during the synchronized control section. A fifth-order function for position control of the electronic cam, a fourth-order function for speed control of the electronic cam and a third-order function for acceleration control of the electronic cam are used in the non-synchronized control section such that operation of the electronic cam at transition points between the synchronized control section and the non-synchronized control section is smoothly controlled.

8 Claims, 17 Drawing Sheets

DISPLACEMENT

SPEED

ACCELERATION

SERVO MOTOR CONTROL SYSTEM

Priority is claimed on Japanese Patent Application 2004-332566 filed Nov. 17, 2004.

BACKGROUND OF THE INVENTION

This invention relates to a servo motor control system.

Industrial machines of many kinds such as a packaging machine make use of a motor such as a servo motor with which speed can be controlled as the source of driving power. A packaging machine comprises a main body part, a film supplying means for pulling out an elongated packaging film to continuously supply it to the main body part and an article supplying means for supplying articles to be packaged to the main body part intermittently at specified intervals. The main body part is adapted to carry out a suitable fabrication process on the supplied film so as to be able to enclose the articles to be packaged (say, into the form of a bag or a pocket) and also to cause the articles to be enclosed in the film. The enclosed articles are transported inside the packaging film, and the packaging film is sealed and cut at suitable positions while it is being transported such that individually separated packages are produced.

The sealing of the packaging film is usually carried out both in the direction of its motion (longitudinal sealing or center sealing) and in the perpendicular direction (end sealing or transverse sealing). Sealing at each position is carried out by using a different sealing apparatus.

The apparatus for end sealing to be effected in the direction perpendicular to the motion of the packaging film is provided with a pair of upper and lower end sealers containing a heater. These end sealers are caused to move on specified trajectories such that the packaging film is sandwiched with a specified pressure in the vertical direction between the sealing surfaces at the ends of the end sealers and the contacting portion of the packaging film is melted and thermally sealed. The trajectories of the sealing surfaces of the end sealers are generally either of the two types, circular and non-circular (such as nearly rectangular). The type which moves on a circular trajectory may be referred to as the rotary motion type, having the end sealers attached to a pair of rotary shaft one above the other such that the end sealers will undergo a rotary motion as the shafts are rotated in specified directions. The sealing surfaces of such end sealers are arcuately formed with their radius of curvature made approximately equal to the radius of their circular trajectories. With the end sealers thus formed, the sealing surfaces make a linear contact progressively from their front part in the direction of their rotations such that an end seal part with the same width as that of the sealing surface is formed.

End sealing apparatus with non-circular trajectories include the so-called box-motion type and the crank-motion type. In either case, a pair of end sealers one above the other is adapted to move horizontally, while sandwiching the film, such that the sealing surfaces can remain in contact with the sealing part of the packaging film for a sufficiently long period of time. This sealing method is convenient in the case of a film material which cannot be melted and softened easily and with which a thermal sealing is difficult because the heating time can be made relatively long.

The sealing surface of the end sealer contains a cutter such that the packaging film can be cut as it is being end-sealed transversely and packages containing articles can be sequentially separated from the front end of the packaging film.

The end sealing apparatus is also adapted to seal a specified part of the packaging film (between two groups of articles to be packaged) in the transverse direction every time the end sealers each make one revolution. This means that the apparatus must be controlled such that the pair of end sealers will sandwich the packaging film in synchronism with the timing at which a specified part of the packaging film to be sealed comes to the position of the end sealing apparatus. Since the packaging pitch (defined as the interval between positions to be end-sealed on the packaging film) is constant if products of the same kind are to be produced while the packaging film is controlled to be transported at a constant speed, the end sealers must be controlled such that they sandwich the packaging film at a constant time interval (equal to the product of speed of transportation and the packaging pitch).

While the end sealers are sandwiching the packaging film, on the other hand, the speed of transportation of the packaging film and the speed of motion of the sealing surfaces of the end sealers must be controlled to be equal. In many situations, however, the desired part to be end-sealed cannot be made to be sandwiched between the end sealers if the speed of motion of the sealing surfaces of the end sealers is controlled to be constant throughout the period during which the end sealers make a complete revolution.

For this reason, the sealing surfaces of the end sealers are controlled so as to move at the same speed as the speed of transportation of the packaging film while the sealing surfaces of the end sealers are sandwiching the packaging film therebetween, to move in a suitable manner while the sealing surfaces are separated from the packaging films and to contact the sealing part of the packaging film correctly when the packaging film comes to be sandwiched again between the sealing surfaces and is thermally sealed.

Recently, as a servo motor is used as the source of power for driving the end sealing apparatus, an electronic cam using a servo motor is coming to be employed for effecting the changes of speed as described above for the end sealers. Regarding the above, the section during which the motion of the end sealers is synchronized with the speed of the packaging film is referred to as the synchronized control section (or simply synchronized control section) and the section during which there is no synchronism is referred to as the non-synchronized control section (or simply non-synchronized control section). During a synchronized control section, the control of the electronic cam is uniquely determined by the speed of transportation of the packaging film. In the case of a rotary motion type, the rotational speed of the servo motor is constant. In the case of a box motion type or a crank motion type, the rotational speed of the servo motor is increased or decreased according to a specified pattern.

Since the rotational speed of the servo motor becomes uniquely determined during a synchronized control section according to the speed of transportation of the packaging film, as explained above, the time of duration of each synchronized control section and that of each non-synchronized control section can be uniquely obtained from the packaging period for the end sealing and the speed of transportation of the packaging film. Thus, it may be simple-mindedly concluded that the servo motor may be rotated during the non-synchronized period at a constant rotational speed obtained by dividing the distance to be traveled by each end sealer (or the angle to be rotated by the motor) during each non-synchronized period by the uniquely determined duration of the non-synchronized period such that the sealing surfaces of the end sealers can be caused to come to the starting position of the next synchronized period at the desired timing.

Japanese Patent Publication Tokkai 2000-198094 discloses a technology for the control of an electronic cam by using a servo motor of this type. This is an example of technology for the control of an electronic cam using a servo motor for a rotary cutter for cutting a film in the transverse direction and a sealing apparatus for sealing the film in the transverse direction and its purpose is to make the transition of the control smooth from a non-synchronized period to the next synchronized period.

Explained more in detail, this is a technology applied to a rotary motion-type and the speed of the cam is controlled so as to be constant (linear) in the synchronized control section and to be represented by a third-order curve in the non-synchronized control section. By this technology, however, the acceleration of the electronic cam could not be controlled to be smooth near the boundary point between a non-synchronized control section and the next synchronized control section. If the acceleration waveform is discontinuous between the two sections, there is a probability of generation of vibrations. In particular, as a number of products to be produced per unit time is increased and a high-speed operation is required, the occurrence of vibrations is likely and becomes a source of obstacles against a high-speed control.

By an off-line method of producing a cam table for the control of an electronic cam, furthermore, it is not possible to produce a non-synchronous cam curve on real-time for specifying a change in the starting position of synchronization, range of synchronization and synchronization ratio of the synchronization curve or the passing of a specified position in order to prevent a machine interference. This makes it necessary to produce a cam table, adversely affecting the efficiency.

SUMMARY OF THE INVENTION

It is therefore an object of this invention to provide a servo motor control system such that the acceleration of an electronic cam can change smoothly between a non-synchronized control section and a synchronized control section.

A method related to this invention is for the control of an electronic cam using a servo motor, being provided with a synchronized control section where control is carried out for moving a follower shaft serving as a controlled object in synchronism with a main shaft position and a non-synchronized control section where control is carried out for moving the follower shaft from the ending position of the synchronized control section to the starting position of the next synchronized control section. A fifth-order function for position control of the electronic cam, a fourth-order function for speed control of the electronic cam and a third-order function for acceleration control of the electronic cam are used in the non-synchronized control section such that operation of the electronic cam at transition points between the synchronized control section and the non-synchronized control section is smoothly controlled.

In the above, and throughout herein, the "main shaft" means the shaft that provides the standard time of the whole system. For example, what is herein referred to as the "main shaft position" can be obtained by attaching an encoder to this main shaft to obtain a signal based on its rotation. In order to obtain a standard time, the inner time of the controller for the system may be used as the main shaft. A follower shaft (or simply "a follower") will be defined as a shaft that rotates according to the motion of the main shaft through a certain function, coefficients and constants. The synchronized control means a control such that a specified part of the follower shaft will be at a specified (same) position at a specified (same) time as a specified object (such as a workpiece) connected to the main shaft. Thus, a function that represents the relationship between the main shaft and the follower shaft at the time of a synchronized control is necessarily determined, and the curve that is represented by this function is herein referred to as the synchronization curve.

The "cam position" is herein defined as the positional relationship between the main shaft and the follower shaft. If the angular position of the follower shaft is represented by $\theta$ and the position (not necessarily angular position) is represented by x, the functional relationship between them can be expressed as $\theta=f(x)$. The cam speed and the cam acceleration are respectively defined as $d\theta/dx$ and $d^2\theta/dx^2$.

The non-synchronized control means the control in the section when the aforementioned synchronized control is not being carried out. In other words, after a synchronized control period is ended and the next synchronized control period is started, the cam position, the cam speed and the cam acceleration are controlled such that the cam position, the cam speed and the cam acceleration will be connected without discontinuities to their values at the start of the next synchronized control section.

According to a preferred embodiment of the invention, values of main shaft position, cam position, cam speed and cam acceleration are data on ending position of the non-synchronized control section and acceptable as input parameters for the fifth-order, fourth-order and third-order functions and these values of main shaft position, cam position, cam speed and cam acceleration obtained in the previous control cycle as data on starting position of the non-synchronized control section are used in each control cycle as input parameters for these fifth-order, fourth-order and third-order functions.

It is also preferable that the fifth-order function be obtained so as to pass through the cam position corresponding to a main shaft position which is set as a specified middle point in the non-synchronized control section and that the third-order function be obtained such that the cam acceleration at this middle point approaches zero.

A servo motor control system embodying this invention is provided with a synchronized control section and a non-synchronized control section as defined above and may be characterized as comprising a boundary generating part for setting main shaft position, cam position, cam speed and cam acceleration corresponding to starting and ending positions of the non-synchronized control section, a judging part for judging whether an obtained cam position is in the synchronized control section or in the non-synchronized control section, control curve generating part for generating a non-synchronization curve of a fifth order function of cam position corresponding to the main shaft position, a non-synchronization curve of a fourth order function of cam speed corresponding to the main shaft position and a non-synchronization curve of a third order function of cam acceleration corresponding to the main shaft position based on the cam position, the cam speed and the cam acceleration at the starting and ending positions of the non-synchronized control section if the judging part judges the obtained cam position to be in the non-synchronized control section, and a command setting part that generates and outputs output data for operating the servo motor based on each of the non-synchronization curves obtained by the control curve generating part and the obtained cam position.

It is preferable that the control curve generating part serve, in the non-synchronized control section, to allow values of the main shaft position, the cam position, the cam speed and the cam acceleration at the ending position of the non-synchronized control section to be inputted and to sequentially generate the non-synchronization curves based on the inputted values.

It is also preferable that the control curve generating part be adapted to generate a non-synchronization curve for each control cycle of the non-synchronized control section by using the main shaft position, the cam position, the cam speed and the cam acceleration of the previous cycle as the starting potion of the non-synchronization curve.

The servo motor control system of this invention may further comprise a condition setting part for setting a specified middle passing point in the non-synchronized control section, wherein the control curve generating part obtains the fifth-order function so as to pass through a cam position of a specified middle passing point set by the condition setting part with respect to the main shaft position when the non-synchronization curve is generated in the non-synchronized control section and generates the third-order function such that the cam acceleration at the specified middle passing point approaches zero. The control curve generating part may be adapted to generate a synchronization curve that is set on the basis of a box motion curve or a crank motion curve in the synchronized control section.

By the method and the system of this invention, the operation mode can be smoothly connected between a synchronized control section and a non-synchronized control section because a fifth-order curve is used for the cam position with respect to the main shaft position for the non-synchronization curve. Since the non-synchronization curve is sequentially calculated in the control cycle in the non-synchronized control section and the values obtained in the previous control cycle are used as data at the starting position of the non-synchronized control section of the following control cycle, a desirable result can be obtained even if a target position is modified.

DETAILED DESCRIPTION OF THE INVENTION

Figure 1:
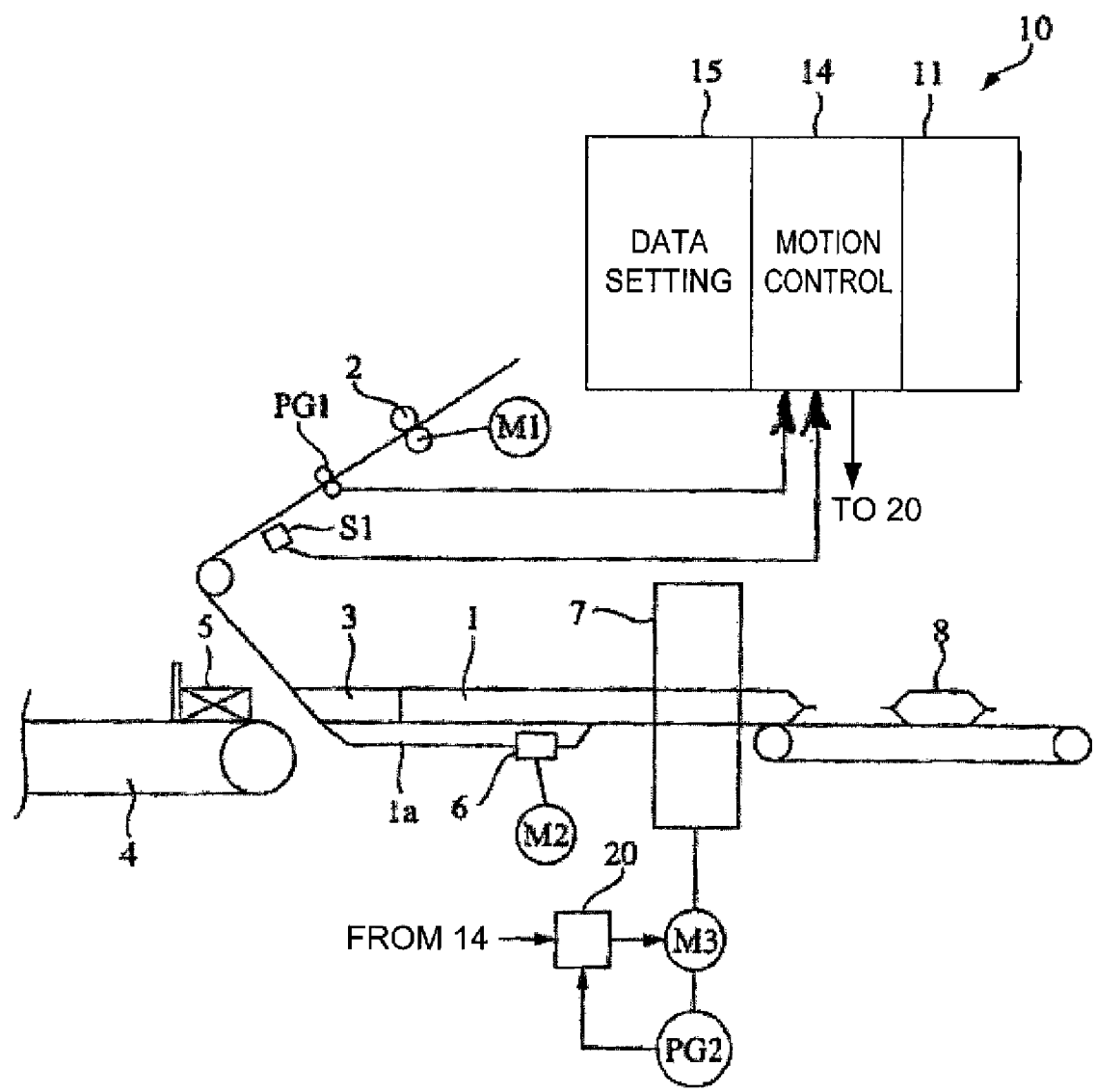
FIG. 1 is a structural diagram of a packaging system to which an embodiment of this invention is applied.

FIG. 1 shows a control system of a packaging machine as an example of control system embodying this invention. To explain the packaging machine serving as the object of control, numeral 1 indicates a packaging film which is sandwiched between a pair of feed rollers 2 and pulled out continuously at a constant speed by the rotary motion of these feed rollers 2. The packaging film 1 is then formed into the shape of a bag by passing over a bag former 3. An article transporting device 4 such as a finger conveyer is disposed on the upstream side of the bag former 3, serving to transport articles 5 to be packaged at fixed intervals and to supply them into the bag former 3 at a specified timing. As a result, the packaging film 1 formed in a cylindrical shape comes to enclose the articles 5 at the fixed intervals and is transported in this condition.

A center sealing apparatus 6 and an end sealing apparatus 7 are provided on the downstream side of the bag former 3. The center sealing apparatus 6 includes a pair of heater rollers and serves to thermally seal the packaging film 1 formed in the shape of a bag by sandwiching its mutually overlapping side portions 1a as they pass therethrough. The end sealing apparatus 7 is for transversely sealing the cylindrically formed packaging film 1 at a specified position (between enclosed articles in front and behind) and also cutting it and, as will be explained in detail below, may be of any of different types such as the box motion type or the crank motion type. Whatever may be its type, it includes a pair of upper and lower end sealers, their mutually oppositely facing surfaces serving as sealing surfaces. These sealing surfaces are adapted to move on specified endless trajectories, sandwiching the packaging film therebetween both from above and below once every time each end sealer makes a complete revolution to heat and press it for thermal sealing. A cutter is contained in the sealing surface for cutting the packaging film to produce individual packages 8.

The feed rollers 2, the center sealing apparatus 6 and the end sealing apparatus 7 are respectively connected to driver motors M1, M2 and M3. Each of these driver motors M1-M3 is adapted to receive a command value from a controller 10 to rotate at a specified speed. This controller 10 is incorporated in the packaging machine and serves as its controller.

According to the present example, the packaging film 1 is transported at a constant speed and hence the first driver motor M1 is rotated at a constant rotational speed. The second driver motor M2 is rotated at a constant rotational speed such that the linear speed of the outer edges of the heating rollers of the center sealing apparatus 6 (for contacting the side edge portions 1a of the packaging film 1) will move at a speed either equal to or somewhat faster than the speed of transportation of the packaging film 1. If the rotational speed of the first driver motor M1 increases or decreases for whatever reason and the speed of the transportation of the packaging film is varied, the rotational speed of the second driver motor M2 is adapted to change accordingly.

The third driver motor M3 comprises a servo motor, its rotational speed being controlled so as to increase and decrease according to the condition of transportation of the packaging film 1. The packaging film 1 has marks printed along one of its side edges at fixed intervals, each at a position displaced from an end-seal position by a specified distance (which may be zero). Since the distance to be traveled by the packaging film 1 between a mark sensor S1 and the end sealing apparatus 7 and the speed of transportation of the packaging film 1 are both known, the length of time from when a mark is detected by the mark sensor S1 until the end-seal position corresponding to this mark reaches the end sealing apparatus 7 can be obtained. Thus, the third driver motor M3 is controlled such that a specified speed control is carried out while the end sealers are separated from the packaging film 1, a non-synchronized control is carried out when an end-seal position of the packaging film 1 comes to the end sealing apparatus 7 such that the pair of end sealers will sandwich the packaging film, and a synchronized control is carried out in this sandwiched condition so as to match the speed of transportation of the packaging film 1.

This packaging machine operates on the basis of control signals from the controller 10. The controller 10 is provided with a power source unit 11, a motion control unit (motion controller) 14 and a data setting control unit (data setting controller) 15 adapted to set data for this motion control unit 14. These units are connected together electrically and mechanically. It goes without saying that units of other kinds may also be connected. Although it is a dedicated controller according to this invention for using servo motors to control an electronic cam, the motion control unit 14 and the data setting control unit 15 may be a unit forming a programmable controller (PLC), connecting together with a CPU unit and an IO unit to integrate with the PLC.

Since the operations of the end sealing apparatus 7 are controlled based on the motion of the packing film 1, the shaft for the transportation of the packaging film serves as the "main shaft" and the shaft for the operations of the end sealing apparatus 7 (driven by the third driver motor M3) serves as the "follower shaft." The operations of the main shaft (for the transportation of the packaging film 1) are based on the output from a main shaft encoder PG1. The main shaft encoder PG1 may be arranged in different ways. Its rotary shaft may be arranged to contact the packaging film 1 and to rotate according to the motion of the packaging film 1 or it may be connected to the rotary shaft of the feed roller 2. Detection signals from this main shaft encoder PG1 are transmitted to the motion control unit 14. The motion control unit 14 is also adapted to receive detection signals from the mark sensor S1. A calculation is carried out by the motion control unit 14 and a command value (or a pulse array) based on the result of this calculation is outputted to a servo driver 20 which carries out the control (both synchronized and non-synchronized) of the rotary motion of the third driver motor M3 based on the command value received from the motion control unit 14 and an output signal from a follower shaft encoder PG2 connected to the third driver motor M3 serving as the follower shaft servo motor.

Next, the internal structure of the data setting control unit 15 and the motion control unit 14, which are essential parts of this invention, will be explained. For the convenience of explanation, FIG. 2 describes the packaging machine only schematically. As for the end sealing apparatus 7 which is the object of control, its electronic cam serving as the follower shaft is schematically illustrated by a circle. Every time the end sealer moves around this electronic cam, it moves by one cycle along a specified trajectory during which the packaging film 1 is sandwiched once from above and below, sealed and cut.

The distance traveled by the packaging film from a reference position (reset position) is obtained based on an output from the main shaft encoder PG1. According to the present embodiment, the traveled distance (displacement) is not reset every time a package is produced but it is cumulatively integrated. The phase (the cam position by angle θ) of the follower shaft (the electronic cam) is accordingly also integrated. In other words, if the upward direction at 0° is defined as the reference position of the follower shaft, the change of the cam position during the first cycle is from 0° to 360° but the second cycle is considered to start from 360° and to change to 720°. This continues on subsequently until it is reset.

Figure 2:
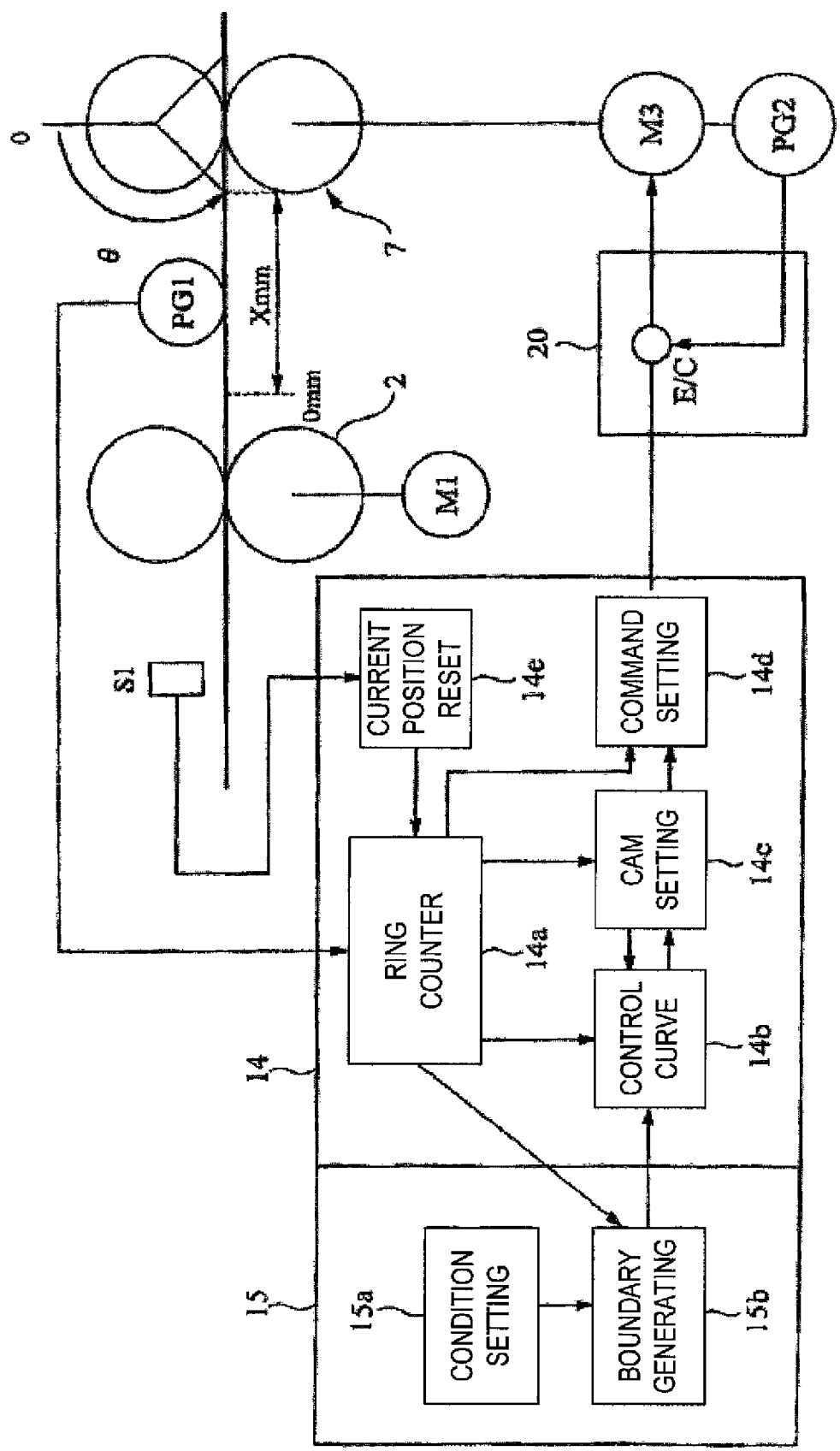
FIG. 2 is a schematic block diagram of a control system embodying this invention.

The data setting control unit 15 is provided with a condition setting part 15a and a boundary generating part 15b, as shown in FIG. 2. The condition setting part 15a serves to receive the input of action starting position, synchronization start position, synchronization range, synchronization ratio, passing position during non-synchronization and action ending position. These received conditions are provided to the boundary generating part 15b.

In the above, "action starting position" and "action ending position" indicate where a series of operations such as packaging starts and where it ends. In general, the phase (angle $\theta$) of the follower shaft starts at 0° and becomes 360°×n where n is a positive integer. "Synchronization starting position" is for specifying the starting position of the section for synchronized control of the electronic cam. It is set by the phase (angle $\theta s$) of the follower shaft. "Synchronization range" is for specifying how long the synchronization should continue from its starting position for carrying out operations such as the sealing operation. The synchronization ending position can be calculated by adding the synchronization starting position and the synchronization range.

"Synchronization ratio" is for setting a condition for varying the speed ratio of the follower shaft while synchronizing by carrying out multiplication and division on the position of the main shaft position. The position of the follower shaft (the cam position by angle $\theta$) is determined according to the distance of travel (position) by the main shaft in the synchronized control section by using this synchronization ratio and the angular speed of the follower shaft is also determined. In other words, the synchronization curve during the synchronized control section is determined.

A "passing point" may be specified as a point to be passed during a non-synchronized control. The position of the follower shaft with respect to the position of the main shaft, for example, may be specified.

These conditions may be set initially by the user through an operation panel (such as a programmable display device or a touch panel) attached to the packaging machine. The user may reset the conditions by observing the conditions of the packaging process or the conditions may be automatically reset according to a sensor output.

The boundary generating part 15b serves to obtain the position, speed and acceleration of the cam at a boundary point between a synchronization curve and a non-synchronization curve based on the conditions set by the condition setting part 15a and the current main shaft position x obtained through the motion control unit 14. The synchronization curve is uniquely determined by the structure of the end sealing apparatus to be controlled and the film transportation speed or, more precisely, from the synchronization ratio. Thus, the position of the main shaft, the cam position, the cam speed and the cam acceleration at the boundary from a synchronized control section to the next non-synchronized control section ($x_e$, $\theta_e$, $\omega_e$, and $\alpha_e$) and those at the boundary from a non-synchronized control section to the next synchronized control section ($x_s$, $\theta_s$, $\omega_s$, and $\alpha_s$) are obtained.

Explained more in detail, the main shaft positions $x_e$ and $x_s$ of each displaced point during the first packaging process are given by the condition setting part 15a, and the cam position, speed and acceleration at each main shaft position can be calculated as the synchronization curve is preliminarily provided to the boundary generating part 15b. Since the main shaft positions and the cam positions are integrated, as explained above, the main shaft position $x_e$ and $x_s$ at each boundary point after the second cycle of the packaging process can be obtained by sequentially adding the distance of the packaging pitch (end seal intervals). Similarly, the cam positions $\theta_e$ and $\theta_s$ at each boundary point can be obtained by adding 360°. Unless there is a change in the condition setting, the cam speed and acceleration at the boundary points after the second cycle are the same as in the first cycle. The cycle number of the current packaging operation can be identified from the main shaft position data obtained from the motion control unit 14. If necessary, values at a new boundary point are calculated and set in the motion control unit 14.

If the "passing point" is set, corresponding four values (that is, the main shaft position=$x_m$, the cam position=$\theta_m$, the cam speed=$\omega_m$ and the cam acceleration=$\alpha_m$) at the passing point (identifying point) specified based on the non-synchronization curve are calculated based on the non-synchronization curve.

The non-synchronization curve is obtained as a fifth-order curve regarding the cam position, a fourth-order curve regarding the cam speed and a third-order curve regarding the cam acceleration. In other words, the cam position becomes a fifth-order control curve in a basic non-synchronized control section which passes through the starting point of the non-synchronization curve starting position (the synchronization curve ending position) and the non-synchronization curve ending position (the synchronization curve starting position). If the passing point is specified, a fifth-order curve passing also through this specified point (identifying point) is obtained and serves as the control curve (the non-synchronization curve) for the non-synchronized control section.

As shown in FIG. 2, the motion control unit 14 includes a current main data obtaining part 14a for obtaining data such as the position data for the main shaft, etc., a control curve generating part 14b, a cam setting part 14c, a command setting part 14d and a current position resetting part 14e.

The current main data obtaining part 14a is provided with a ring counter and serves to obtain the current main shaft position (as a distance from a reference position) by counting up the pulse output from the main shaft encoder PG1 by means of this ring counter, to calculate the current main shaft speed from the change in the main shaft position per unit time and further to obtain the main shaft acceleration by calculating it from the change in this main shaft speed. The calculated main shaft position, speed and acceleration are transmitted to a cam boundary point generating part 15b, the control curve generating part 14b and the command setting part 14d.

The current position resetting part 14e serves to reset the ring counter of the current main data obtaining part 14a so as to restart the reference position from 0. This can be done at any time based on a detection signal from the mark sensor S1. A reset command may be outputted to the current main data obtaining part 14a on the condition that a detection signal for mark detection has been received from the mark sensor S1 after a separately provided reset switch (which may be a mechanical switch or an electronic switch based on a touch on an operation panel such as a programmable display or a touch panel) is pressed. Thus, a manual input by the user need not be depended on. The ring counter may be arranged to be automatically reset under a preliminarily determined condition such that the detection of a mark by the mark sensor S1 has reached a specified number of times since the beginning of a normal operation.

The control curve generating part 14b is for generating synchronization and non-synchronization curves. It is adapted to receive the aforementioned four values $x_e$, $\theta_e$, $\omega_e$, and $\alpha_e$ respectively of the main shaft position, the cam position, speed and acceleration at a non-synchronization curve ending position (synchronization curve starting position), the aforementioned four values $x_s$, $\theta_s$, $\omega_s$, and $\alpha_s$ respectively of the main shaft position, the cam position, speed and acceleration at a non-synchronization curve starting position (synchronization curve ending position) and the synchronization ratio from the boundary generating part 15b of the data setting control unit 15. The current main shaft position x is received from the current main data obtaining part 14a and is judged whether or not it is within a synchronized control section. If it is within a synchronized control section, a synchronization curve is generated. If it is within a non-synchronized control section, a non-synchronization curve is generated. Explained more in detail, a synchronization position curve, a synchronization speed curve and a synchronization acceleration curve are generated from the synchronization curve based on the synchronization ratio.

On the other hand, the obtaining value of the main shaft position x is substituted to the formulas given below to calculate a fifth-order curve for defining a cam position, a fourth-order curve for defining a cam speed and a third-order curve for defining a cam acceleration from the non-synchronization curve:

$$\theta = A_5(x-x_s)^5 + A_4(x-x_s)^4 + A_3(x-x_s)^3 + 0.5\alpha_s(x-x_s)^2 + \omega_s(x-x_s) + \theta_s,$$

$$d\theta/dx = 5A_5(x-x_s)^4 + 4A_4(x-x_s)^3 + 3A_3(x-x_s)^2 + \alpha_s(x-x_s) + \omega_s,$$

$$d^2\theta/dx^2 = 20A_5(x-x_s)^3 + 12A_4(x-x_s)^2 + 6A_3(x-x_s) + \alpha_s,$$

where $\theta$, $d\theta/dx$ and $d^2\theta/dx^2$ are in units respectively of deg, deg/mm and deg/mm$^2$ and the coefficients are:

$$A_5 = 6(\theta_e - \theta_s)/(x_e - x_s)^5 - 3(\omega_e + \omega_s)/(x_e - x_s)^4 + 0.5(\alpha_e - \alpha_s)/(x_e - x_s)^3,$$

$$A_4 = -15(\theta_e - \theta_s)/(x_e - x_s)^4 + (7\omega_e + 8\omega_s)/(x_e - x_s)^3 + (1.5\alpha_e - \alpha_s)/(x_e - x_s)^2, \text{ and}$$

$$A_3 = 10(\theta_e - \theta_s)/(x_e - x_s)^3 - 2(2\omega_e + 3\omega_s)(x_e - x_s)^2 + 0.5(\alpha_e - 3\alpha_s)/(x_e - x_s).$$

In these formulas, data obtained from the boundary generating part 15b of the data setting control unit 15 are used for the four values related to the non-synchronization curve ending position. Although data obtained from the boundary generating part 15b are used for the non-synchronization starting position at the first time of generation of non-synchronization curve entering the non-synchronized control section, main shaft position $x_s$, cam position $\theta_s$, cam speed $\omega_s$ and cam acceleration $\alpha_s$ of the previous cycle are used from the next cycle on as for the values related to the non-synchronization curve starting position. The values calculated by the cam setting part 14c of the next stage are set as these values.

Thus, a real-time interpolation control is possible for the synchronization curve by means of a fifth-order curve of a servo system. When there is a change in a target value during a cycle of packaging process, any sudden divergent change in a command value can be prevented by using values obtained in the previous control cycle as non-synchronization curve starting position and obtaining a fifth-order curve passing between this non-synchronization curve starting position and the target value and other related curves. In situations where such real-time interpolation control is not necessary, it goes without saying that data obtained from the boundary generating part 15b may be used for the non-synchronization curve starting position.

The cam setting part 14c obtains not only curves created by the control curve generating part 14b (synchronization and non-synchronization curves) but also the current position x of the main shaft obtained by the current main data obtaining part 14a and sets the cam position, speed and acceleration corresponding to the current main shaft position. As the control curve generating part 14b generates either the synchronization curve or the non-synchronization curve corresponding to the current main shaft position, this generated curve is transmitted to the cam setting part 14c, and the cam setting part 14c substitutes the values of the current main shaft position into the variable x in the function representing the given curve and thereby obtains the cam position, speed and acceleration.

These values of cam position, speed and acceleration, thus obtained, are transmitted to the control curve generating part 14b for the next control cycle and also to the command setting part 14d which also obtains the main shaft speed dx/dt and the main shaft acceleration $d^2x/dt^2$ from the current main data obtaining part 14a. The follower position, speed and acceleration are obtained from the following formulas based on these obtained data and transmitted to the servo driver 20.

Follower position=Cam position, $$d\theta/dt = (d\theta/dx)(dx/dt),$$

$$d^2\theta/dt^2 = (d^2\theta/dx^2)(dx/dt)^2 + (d\theta/dx)(d^2x/dt^2)$$

where $d\theta/dt$ and $d^2\theta/dt^2$ are respectively in units of (deg/mm) and (deg/mm$^2$).

Figure 3:
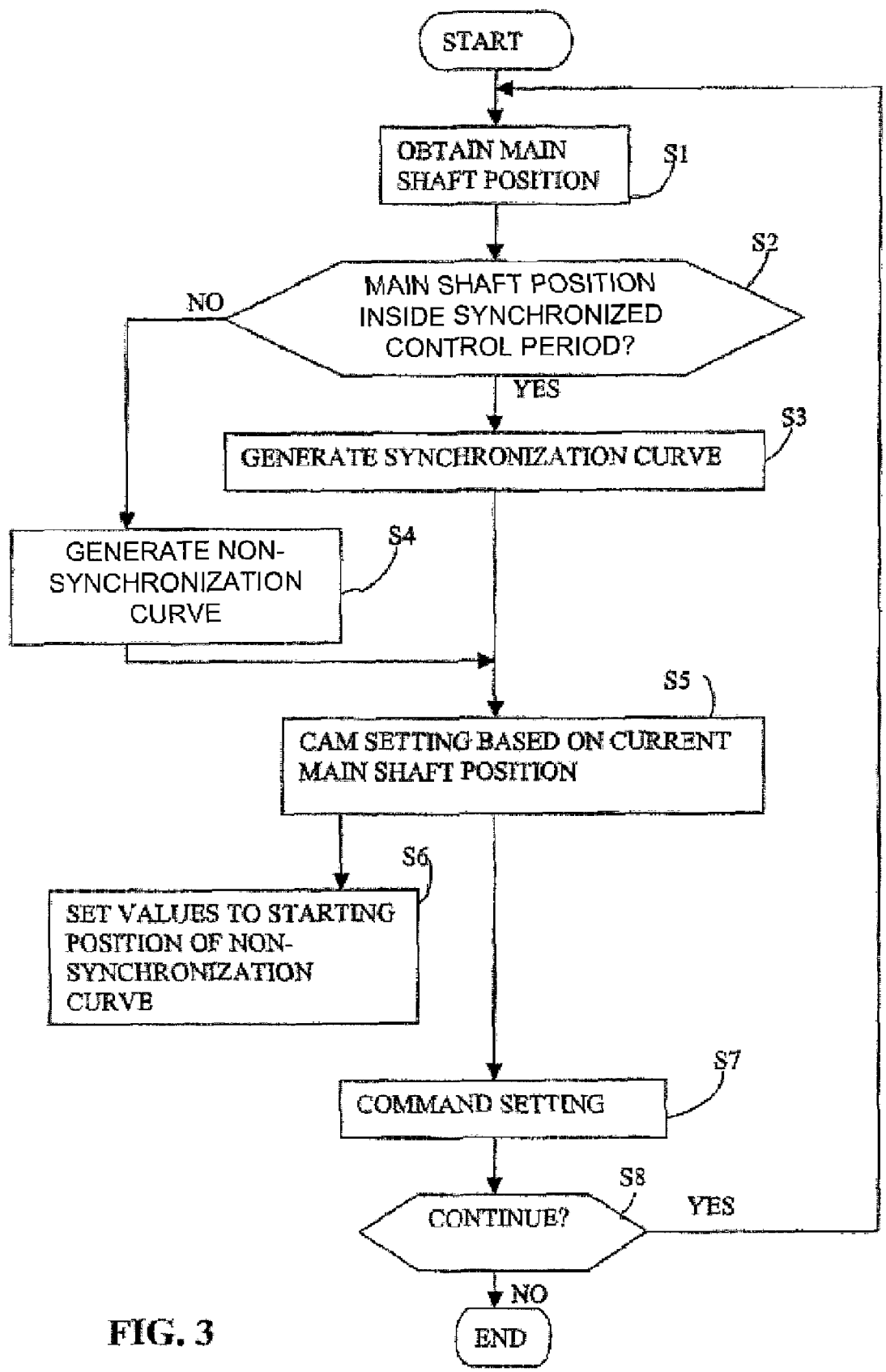
FIG. 3 is a flowchart showing the function of the motion control unit.

FIG. 3 is a flowchart of the operations by the motion controller unit 14, executed in each control cycle. To start, the current main data obtaining part 14a obtains the current main shaft position x from the main shaft encoder PG1 (Step S1). The control curve generating part 14b (serving as a "judging part") examines on the basis of the obtained current position x whether the main shaft position is within the synchronized control section or not (Step S2). If it is within the synchronized control section (YES in Step S2), the synchronization curves are generated (Step S3). If it is not in the synchronized control section (is in the non-synchronized control section) (NO in Step S2), the non-synchronized curves (fifth-order, fourth-order and third-order) are generated (Step S4). Processing for these curves are as explained above.

Next, the cam setting part 14c sets the current values (position, speed and acceleration) of the electronic cam based on the curves generated in Step S3 or S4 (Step S5). These set values are transmitted to the control curve generating part 14b as the non-synchronization curve starting position (Step S6).

Commands to the servo driver 20 are obtained based on the cam values obtained in Step S5 and outputted (Step S7) and then it is determined whether to continue or not (Step S8). If it is to be continued (YES in Step S8), the process returns to Step S1 and the next cycle is started. The judgment whether to continue depends, for example, on whether or not an end command or a stop command for the packaging operations has been inputted or whether or not a preliminarily set condition (such as the number of packages to be produced and whether or not the ending time has been reached) has come to be satisfied.

Figure 4:
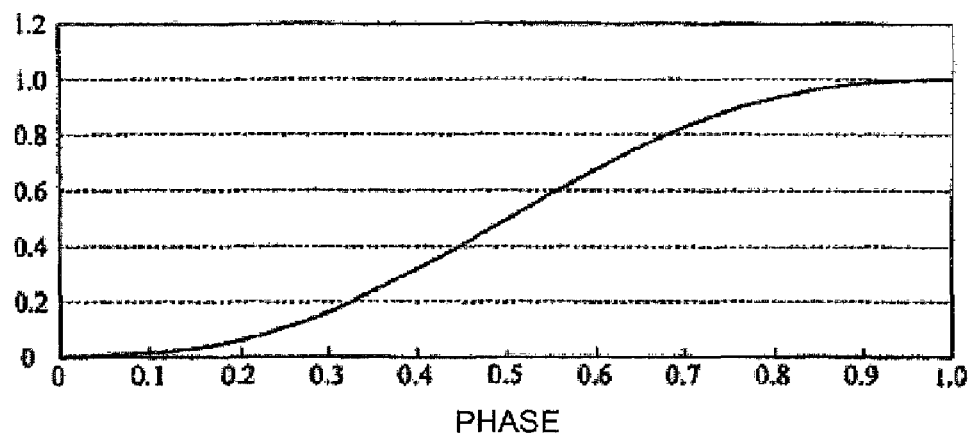
FIG. 4 is a drawing of a non-synchronization curve for showing the phase-position characteristic in a non-synchronized control section.
Figure 5:
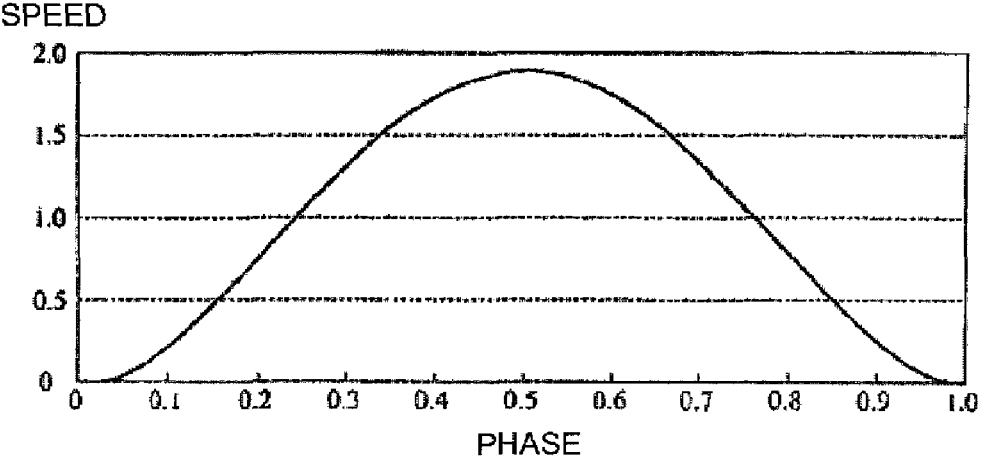
FIG. 5 is a drawing of a non-synchronization curve for showing the phase-speed characteristic in a non-synchronized control section.
Figure 6:
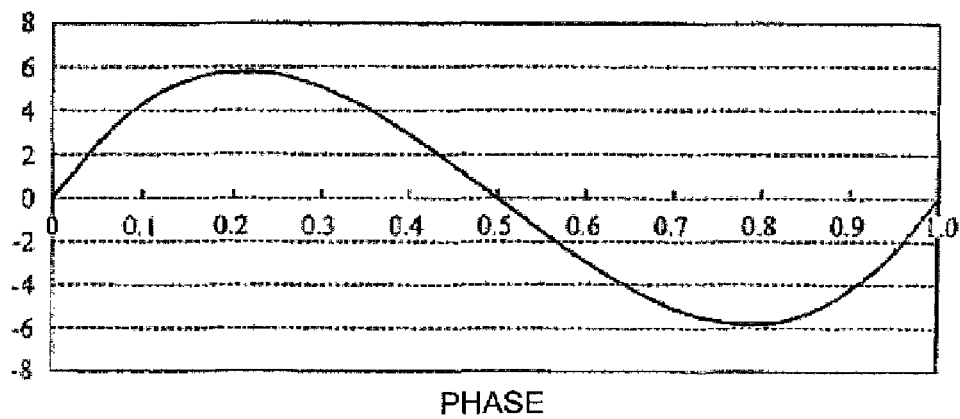
FIG. 6 is a drawing of a non-synchronization curve for showing the phase-acceleration characteristic in a non-synchronized control section.

FIGS. 4-6 are examples of control curves in a non-synchronized control section (non-synchronization curves). FIG. 4 shows a correlation of displacement (cam position for follower shaft) with respect to the phase (main shaft position), FIG. 5 shows a correlation of speed with respect to the phase (main shaft position), and FIG. 6 shows a correlation of acceleration with respect to the phase (main shaft position). If there is assumed to be no change in the synchronization target position (boundary point at the ending and starting positions in a non-synchronized control section), the cam position, speed and acceleration change repeatedly as shown in FIGS. 4-6 within a synchronized control section. It is also similar when non-synchronization curves are generated by using each of the values set in Step S6 based on the current main shaft position as the non-synchronization curve starting position at the time of the next control cycle. Since the speed and the acceleration are both zero or nearly zero at the boundary point in both situations, they can be smoothly connected to the synchronization curves in the synchronized control section and no vibrations or shocks occur at the boundary point.

Figure 7:
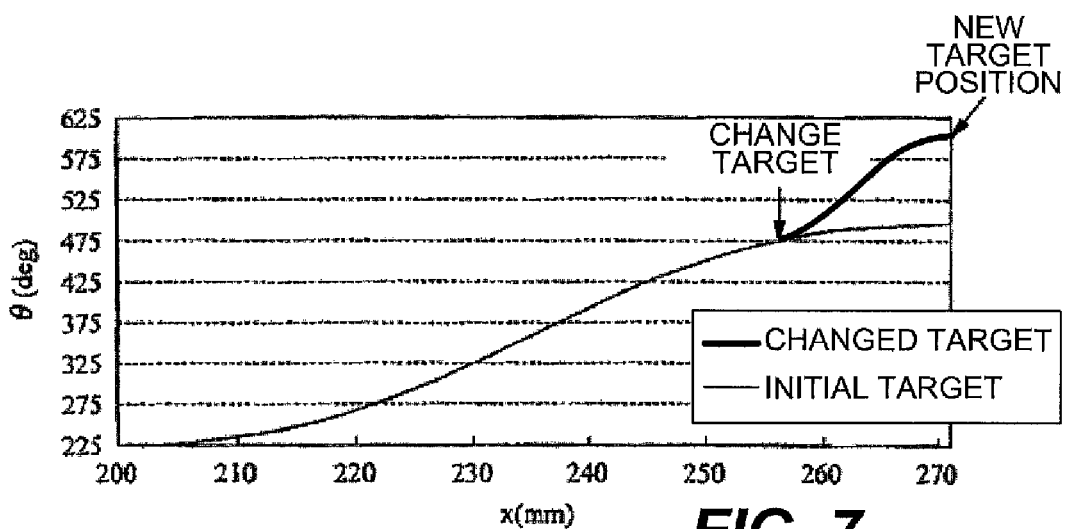
FIG. 7 is a drawing of a non-synchronization curve for showing the phase-position characteristic in a non-synchronized control section when a target value has been changed.
Figure 8:
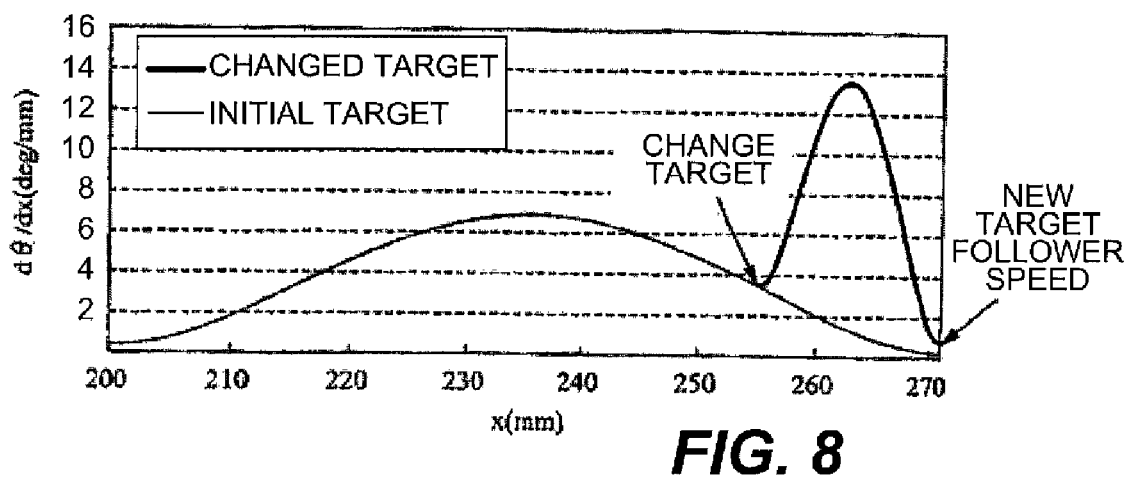
FIG. 8 is a drawing of a non-synchronization curve for showing the phase-speed characteristic in a non-synchronized control section when a target value has been changed.
Figure 9:
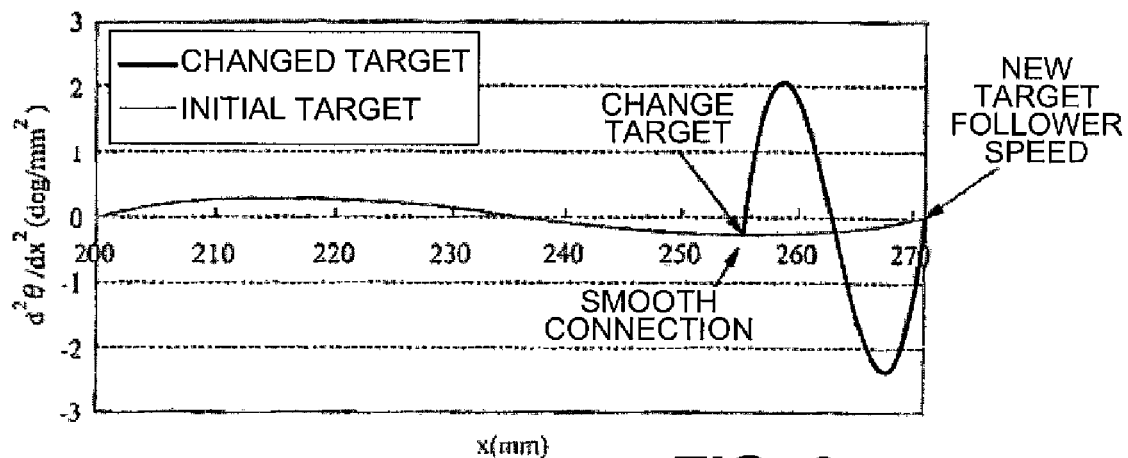
FIG. 9 is a drawing of a non-synchronization curve for showing the phase-acceleration characteristic in a non-synchronized control section when a target value has been changed.

Now, the main shaft position, the follower shaft position, speed and acceleration of the non-synchronization curve starting position are respectively set as $x_s=200$ mm, $\theta_s=225$ deg, $\omega s=0.382$ deg/mm and $\alpha_s=-0.00509$ deg/mm$^2$, as shown in FIGS. 7-9. Those of the initial non-synchronization curve ending position (the synchronization curve starting position) are set respectively as $x_e=271$ mm, $\theta_e=495$ deg, $\omega_e=0.267$ deg/mm and $\alpha_e=0.00250$ deg/mm$^2$. Under this condition, when the main shaft position is 255 mm, the main shaft position, the follower shaft position, speed and acceleration of the non-synchronization curve ending position (synchronization curve starting position) are changed respectively to $x_e=271$ mm, $\theta_e=600$ deg, $\omega_e=0.763$ deg/mm and $\alpha_e=0.02012$ deg/mm$^2$. If this is done, mechanical shocks and vibrations can be prevented because the non-synchronization curves connecting the position, speed and acceleration immediate before the main shaft position is 255 mm and the changed values are reset.

If the changes as described above were made when the main shaft position is 255 mm and the control curve (non-synchronization curve) connecting the main shaft position $x_s=255$ mm (which would be the starting position of the non-synchronized control section this time) and the new target value were reset, the values (of the position, speed and acceleration) at the time of 255 mm and those at the present time of 255 mm may be significantly different. In such a case, a connection may not be made by a continuous curve as shown and mechanical shocks and vibrations may occur at this discontinuous point.

Thus, position, speed and acceleration can be connected even in the case of a synchronization curve where the speed is not constant within the synchronized control section and acceleration is generated at both ends and the servo system can be operated by connecting the position, speed and acceleration even if the starting position, speed and acceleration of the next synchronization curve are changed in the middle. Thus, the shocks and vibrations that may be caused to the mechanical system can be reduced and a smooth operation is possible even if the starting position, speed or acceleration of the synchronization curve is changed.

Next, a situation where a middle point within the non-synchronized control section has been specified will be explained. When a passing point (a middle point within the non-synchronized control section) is set by the condition setting part 15a of the data setting control unit 15, data related to this middle point (main shaft position xm, cam position $\theta_m$, cam speed $\omega_m$ and cam acceleration $\alpha_m$) are provided to the synchronization curve generating part 14b through the boundary generating part 15b.

If the current main shaft position x is within the non-synchronized region, the control curve generating part 14b generates the non-synchronization curve. In this case, if the current main shaft position x is such that $x_s \leq x \leq x_m$, the values of $x_e$ and $\theta_e$ in the calculation formulas given above for the non-synchronization curves are such that $x_e=x_m$ and $\theta_e=\theta_m$. At the point in time when the current main shaft position x exceeds $x_m$, $x_s$ and $\theta_s$ are set such that $x_s=x_m$ and $\theta_s=\theta_m$ in the formulas for obtaining these non-synchronization curves.

In short, the fifth-order curves are connected together such that the specified middle point will be passed, and the speed and acceleration both become zero or nearly equal to zero at the middle point.

Figure 10:
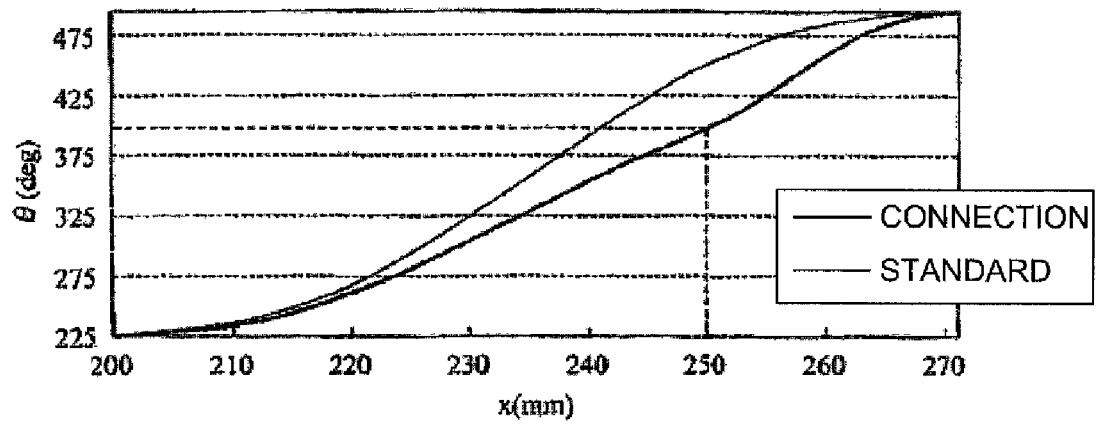
FIG. 10 is a drawing of a non-synchronization curve for showing the phase-position characteristic in a non-synchronized control section when a point to be passed in the non-synchronized control section is specified.
Figure 11:
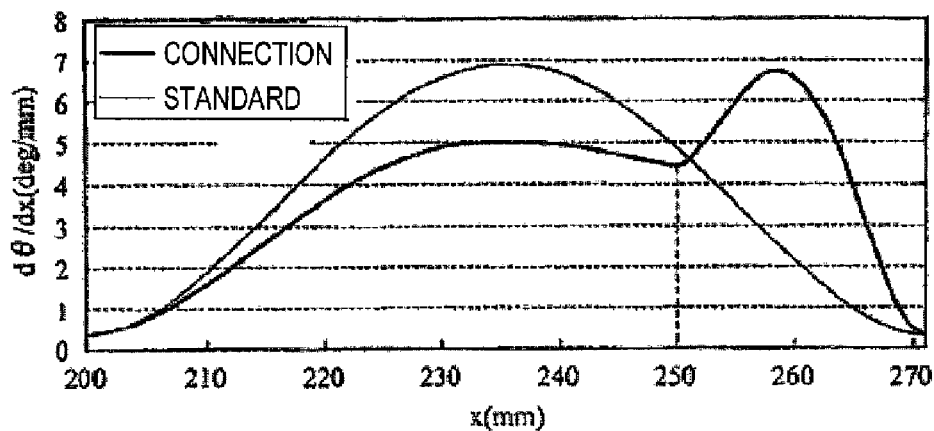
FIG. 11 is a drawing of a non-synchronization curve for showing the phase-speed characteristic in a non-synchronized control section when a point to be passed in the non-synchronized control section is specified.
Figure 12:
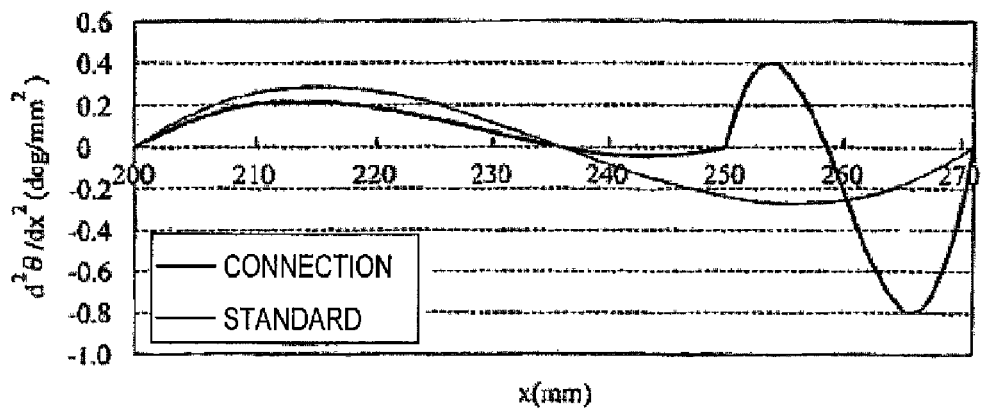
FIG. 12 is a drawing of a non-synchronization curve for showing the phase-acceleration characteristic in a non-synchronized control section when a point to be passed in the non-synchronized control section is specified.

FIGS. 10-12 show an example of non-synchronization curves generated when the main shaft position is within the non-synchronized control section. In FIG. 10 which shows the relationship between the main shaft position and the follower shaft position, there are fifth-order curves which go from the non-synchronization curve starting position (or the synchronization curve ending position) through the specified middle point to the non-synchronization curve ending position (or the synchronization curve starting position). There are two fifth-order curves each ending and starting at this middle point, together forming a smooth connection near this middle point. FIG. 11 shows the relationship between the main shaft position and the follower shaft speed, and FIG. 12 shows the relationship between the main shaft position and the follower shaft acceleration, both showing a non-synchronization curve going from the non-synchronization starting position (or the synchronization ending position) through a specified middle point to the non-synchronization ending position (or the synchronization starting position). FIG. 12 shows that the acceleration at the specified middle point is approaching zero.

The main shaft position, follower position, speed and acceleration at the non-synchronization curve start position are set as follows: $x_s=200$ mm, $\theta_s=225$ deg, $\omega_s=0.382$ deg/mm and $\alpha_s=-0.00509$ deg/mm$^2$. Those at the non-synchronization curve ending position (synchronization curve starting position) are set as follows: xe=271 mm, $\theta_e=495$ deg, $\omega_e=0.267$ deg/mm and $\alpha_e=0.00250$ deg/mm$^2$. Those at the specified middle passing point are set as follows: $x_m=250$ mm, $\theta_m=400$ deg, $\omega_m=(\theta_e-\theta_m)/(x_e-x_m)=4.524$ deg/mm and $\alpha_m=0$ deg/mm$^2$. If this is done, a smooth operation becomes possible by connecting the acceleration as in FIG. 12 which shows the phase-acceleration relationship without stopping motion as in FIG. 11 which shows the phase-speed relationship.

Figure 13:
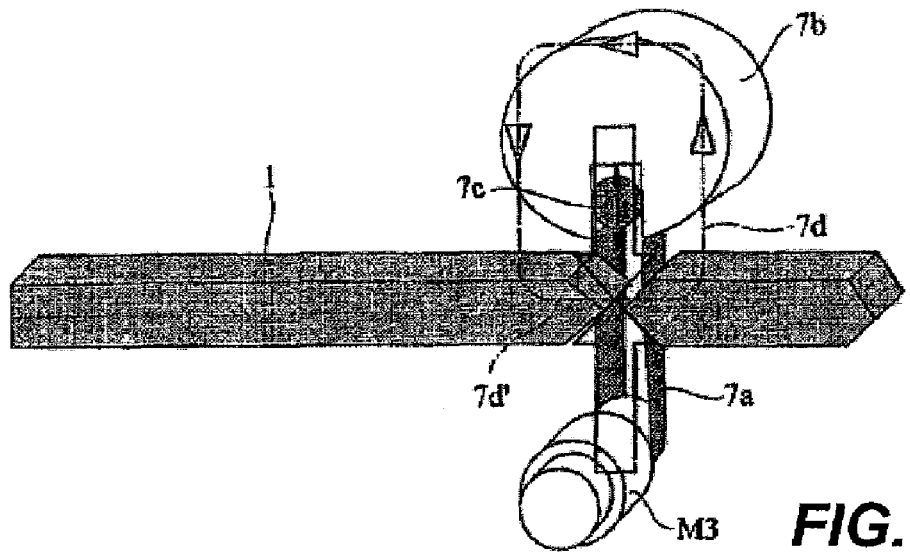
FIG. 13 is a schematic view of an end sealing apparatus of the box motion type.

Next, a situation where the end sealing apparatus 7 is of the box motion type is explained. As schematically shown in FIG. 13, the rotary power of the third driver motor M3 which is a servo motor is communicated to a rotary plate 7b through power communicating means 7a such as a belt or a chain. The rotary plate 7b is provided with a slider 7c adapted to slide reciprocatingly in the radial direction. The slider 7c undergoes not only revolutions caused by the rotation of the rotary plate 7b but also motions in the radial direction at the time of its revolutions. The slider 7c is engaged in a box-shaped guide 7d so as to move on an endless trajectory defined by the guide 7d as the rotary plate 7b rotates and it undergoes its revolutions. The guide 7d has a horizontal section 7d' which is parallel to the motion of the packaging film 1 such that the slider 7c is adapted to move forward along the packaging film 1 for a fixed time period at a constant distance. After this time period, the slider 7c moves upward, backward and downward to return to the original horizontally moving section 7d'. For the convenience of description, FIG. 13 shows only the mechanism on the upper side but a similar mechanism is present also on the lower side.

The slider 7c is integrally connected to the end sealers such that the end sealers also move along the same trajectory as the slider 7c. As the end sealers move along the horizontal section 7d' of the trajectory, their sealing surfaces sandwich and contact the packaging film 1, and the rotary plate 7b is rotated by the synchronized control such that the speed of the end sealers and the speed of transportation of the packaging film 1 are matched. The other portions of the trajectory correspond to the non-synchronized control section.

Although a rectangular trajectory (with rounded corners) is shown in FIG. 13, the trajectory during the non-synchronized period is arbitrary, and the mechanism for the motion on this portion of the trajectory is also arbitrary. For example, the rotary plate 7b as described above may be dispensed with and the end sealers themselves may be formed as the slider 7c. What is required is that the end sealers move along specified endless trajectories including portions along which they move parallel to the packaging film 1 for sandwiching and sealing it, and the mechanism for such trajectories is arbitrary. The rotary plate 7b may be adapted to make a complete revolution for each rotation of the third driver motor M3 or to undergo a different kind of motion. The angle of the aforementioned electronic cam corresponds to the angle of rotation of the rotary plate 7b shown in FIG. 13.

Figure 14:
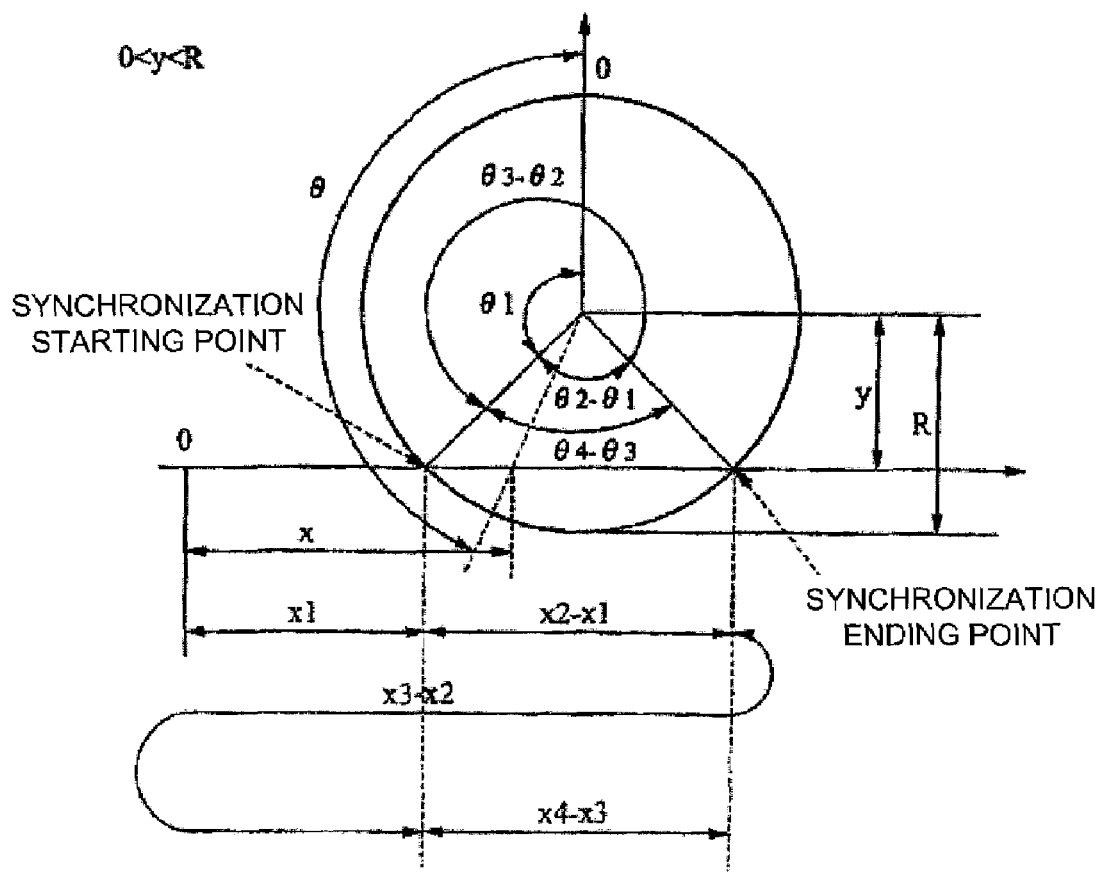
FIG. 14 is an abstracted drawing of a box motion to show the relationship between the electronic cam and the packaging film.

FIG. 14 shows the electronic cam and the packaging film 1 with the mechanism for a box motion shown in an abstract way. Synchronization starts when the packaging film 1 on the main shaft has been transported from the reference position (0 mm) by distance $x_1$ and ends when the main shaft has come to $x_2$. Thus, the distance of travel by the packaging film 1 during the synchronized period is $x_2-x_1$. As for the follower shaft, a packaging process starts when the electronic cam is at the reference position 0° and synchronization starts at $\theta_1$ during the first cycle of packaging process, the synchronized control lasting until $\theta_2$ such that the synchronized control section corresponds to the angular range of $\theta_2-\theta_1$.

A non-synchronized control section starts thereafter and the main shaft position is $x_3$ at the non-synchronization control ending position (the starting position for the next synchronized control section), the cam position of the follower shaft being $\theta_3$. At the ending position of this synchronized control section (the starting position of the next non-synchronized control section), the main shaft position is $x_4$ and the follower cam position is $\theta_4$.

On the cam curve for a box motion for a packaging machine, it is a synchronized control section where the main shaft position x and the follower shaft position $\theta$ are in ranges $x1 \leq x \leq x2$ and $\theta1 \leq \theta \leq \theta2$. The synchronization curves for the cam position $\theta$, cam speed $d\theta/dx$ and cam acceleration $d^2\theta/dx^2$ in this synchronized control section are as follows:

$$\theta = 180(1 - (1/\pi)\tan^{-1}\{\{(x_2 + x_1 - 2z)/(x_2 - x_1)\}\tan\{\pi(\theta_2 - \theta_1)/360\}\});$$

$$\frac{d\theta}{dx} = \frac{360b(x_2 - x_1)\tan\{\pi(\theta_2 - \theta_1)/360\}}{\pi(x_2 - x_1)^2 + \tan^2\{\pi(\theta_2 - \theta_1)/360\}(x_2 + x_1 - z^2)}; \text{ and}$$

$$\frac{d^2\theta}{dx^2} = \frac{1440b^2(x_2 - x_1)(x_2 + x_1 - 2z)\tan^3\{\pi(\theta_2 - \theta_1)/360\}}{\pi\{(x_2 - x_1)^2 + \tan^2\{\pi(\theta_2 - \theta_1)/360\}(x_2 + x_1 - 2z)^2\}^2}$$

where $z=b(x-x_a)$ and $x_a$ represents the displacement of the synchronization starting point in the forward-backward direction and b is a coefficient for changing the synchronization ratio.

In the subsequent synchronized control sections, positions, speeds and accelerations are set as follows for each control cycle of the controller based on the position of the main shaft and by using the formulas give above;

Main shaft speed=dx/dt;

Main shaft acceleration=$d^2x/dt^2$;

Follower shaft position=Cam position $\theta$;

Follower shaft speed=$d\theta/dt=(d\theta/dx)(dx/dt)$; and

Follower shaft acceleration=$d^2\theta/dt^2=(d^2\theta/dt^2)(dx/dt)^2+(d\theta/dx)(d^2x/dt^2)$.

Figure 15:
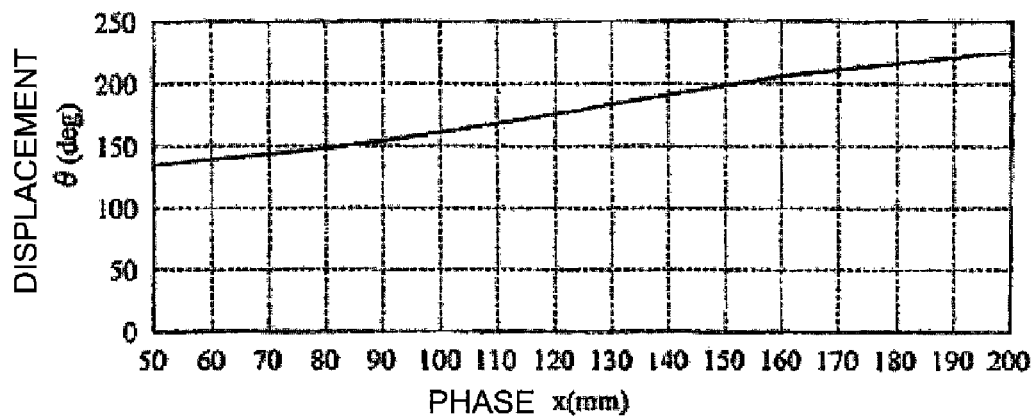
FIG. 15 is a drawing of a synchronization curve for showing the phase-position characteristic in a synchronized control section of a box motion type.
Figure 16:
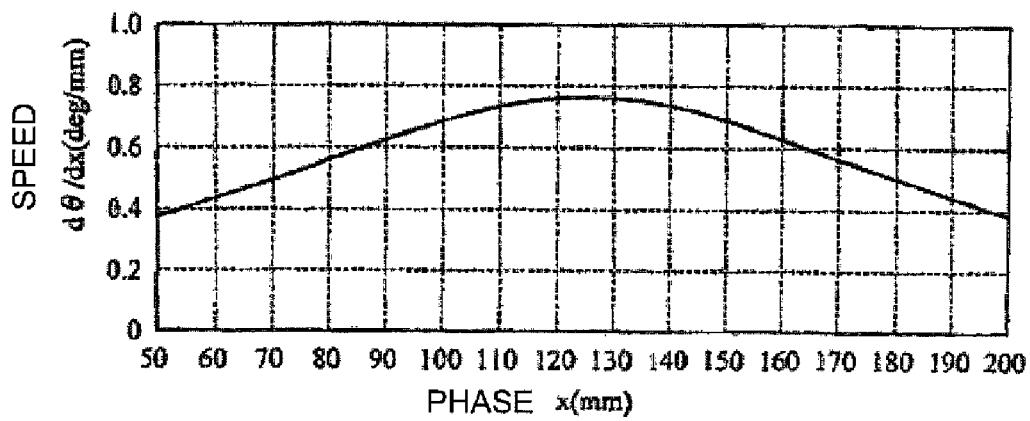
FIG. 16 is a drawing of a synchronization curve for showing the phase-speed characteristic in a synchronized control section of a box motion type.
Figure 17:
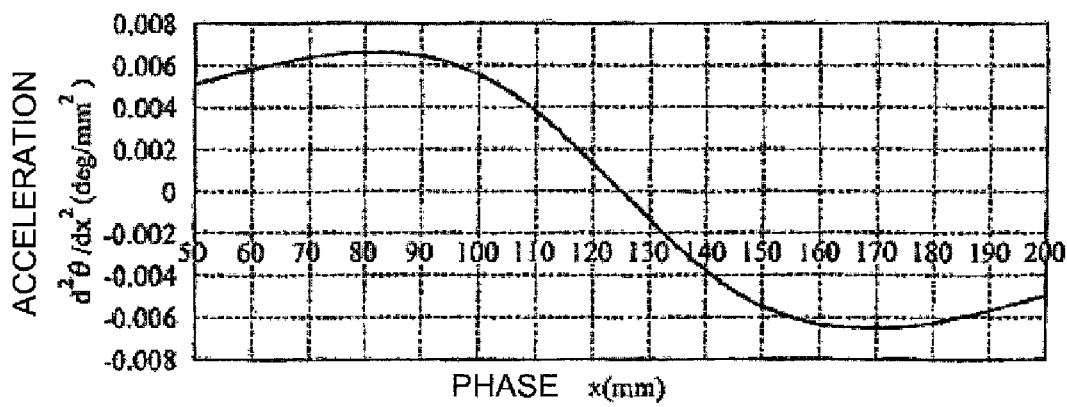
FIG. 17 is a drawing of a synchronization curve for showing the phase-acceleration characteristic in a synchronized control section of a box motion type.

Examples of operation curves in a synchronized control period of a box motion based on the equations given above are shown in FIGS. 15-17 with real units with $x_0=0$ mm, $x_1=50$ mm, $x_2=300$ mm, $\theta_0=0$ deg, $\theta_1=135$ deg, $\theta_2=225$ deg, R=105 mm and y=75 mm.

Next, the calculation of control curves for a non-synchronized control section is explained. At the non-synchronization starting position (the end position of cam synchronization curve in box motion), the main shaft position $x=x_2$(mm). If the synchronization starting point is not displaced, the formulas that determine the synchronization curves described above are given as follows:

$$\theta = 180\left[1 - \frac{1}{\pi} \cdot \tan^{-1}\left\{\frac{(x_2 + x_1 - 2x)}{(x_2 - x_1)}\tan(\pi(\theta_2 - \theta_1)/360)\right\}\right]$$

$$\frac{d\theta}{dx} = \frac{360}{\pi} \cdot \frac{(x_2 - x_1)\tan\{\pi(\theta_2 - \theta_1)/360\}}{(x_2 - x_1)^2 + \tan^2\{\pi(\theta_2 - \theta_1)/360\} \circ (x_2 + x_1 - 2x)^2};$$

$$\frac{d^2\theta}{dx^2} = \frac{1440}{\pi} \cdot \frac{(x_2 - x_1)(x_2 + x_1 - 2x)\tan^3\{\pi(\theta_2 - \theta_1)/360\}}{[(x_2 - x_1)^2 + \tan^2\{\pi(\theta_2 - \theta_1)/360\}(x_2 + x_1 - 2x)]^2}$$

If $x=x_2$ is substituted in these equations, the values of the cam position, speed and acceleration at the synchronization ending position are obtained as follows:

$$\theta = \theta_2(deg) = 180 + (\theta_2 - \theta_1)/2;$$

$$\omega = \omega_2 = \frac{d\theta}{dx} = \frac{360}{\pi} \cdot \frac{\tan\{\pi(\theta_2 - \theta_1)/360\}}{(x_2 - x_1)[1 + \tan^2\{\pi(\theta_2 - \theta_1)/360\}]};$$

$$\alpha = \alpha_2 = \frac{d^2\theta}{dx^2} = -\frac{1440}{\pi} \cdot \frac{\tan^3\{\pi(\theta_2 - \theta_1)/360\}}{(x_2 - x_1)^2[1 + \tan^2\{\pi(\theta_2 - \theta_1)/360\}]^2}.$$

Thus, values $x_s=x_2$; $\theta_s=\theta_2$, $\omega_s=\omega_2$ and $\alpha_s=\alpha_2$ are taken in as previous cam values when the non-synchronization curves are obtained.

When there is no change in the target value, the next synchronized control period starts when the main shaft position becomes $x=x_3$ and the control is carried out according to the control curves while the main shaft position is in the interval between $x_3$ and $x_4$, or when $x_3 \leq x \leq x_4$. The cam position, speed and acceleration are controlled for this synchronized control section according to the synchronization curves given as follows:

$$\theta - 180[1 - (1/\pi)\tan^{-1}\{(x_4 + x_3 - 2x)/(x_4 - x_3)[\tan(\pi(\theta_4 - \theta_3)/360)]\}];$$

$$\frac{d\theta}{dx} = \frac{360}{\pi} \cdot \frac{(x_4 - x_3)\tan\{\pi(\theta_4 - \theta_3)/360\}}{(x_4 - x_3)^2 + \tan^2\{\pi(\theta_4 - \theta_3)/360\}(x_4 + x_3 - 2x)^2};$$

$$\frac{d^2\theta}{dx^2} = \frac{1440}{\pi} \cdot \frac{(x_4 - x_3)(x_4 + x_3 - 2x)\tan^3\{\pi(\theta_4 - \theta_3)/360\}}{[(x_4 - x_3)^2 + \tan^2\{\pi(\theta_4 - \theta_3)/360\}(x_4 + x_3 - 2x)^2]^2}.$$

Values of the cam position, speed and acceleration at the starting position ($x=x_3$) of this synchronized control section can be obtained from the following equation:

$$\theta - \theta_3(deg) = 180 - (\theta_4 - \theta_3)/2;$$

$$\frac{d\theta}{dx} = \omega_3 = \frac{360}{\pi} \cdot \frac{\tan\{\pi(\theta_4 - \theta_3)/360\}}{(x_4 - x_3)[1 + \tan^2\{\pi(\theta_4 - \theta_3)/360\}]};$$

-continued $$\frac{d^2\theta}{dx^2} = \alpha_3 = \frac{1440}{\pi} \cdot \frac{\tan^3\{\pi(\theta_4 - \theta_3)/360\}}{(x_4 - x_3)^2[1 + \tan^2\{\pi(\theta_4 - \theta_3)/360\}]^2}.$$

The values thus obtained become those of the end positions of the non-synchronized control section where the main shaft position is in the interval $x_2 \leq x \leq x_3$, that is, the target values of this non-synchronized control section. In other words, they are set as $x_e = x_3$, $\theta_e = \theta_3$, $\omega_e = \omega_3$ and $\alpha_e = \alpha_3$ to the non-synchronization curves.

Since the target value when the main shaft position is $x = x_2$ (or the main shaft position at the end position of the non-synchronized control section) is $x_e = x_3$, a fifth-order equation passing both these points is generated. When the current main shaft position x is such that $x_s \leq x \leq x_e$, or $x_2 \leq x \leq x_3$, fifth-order curves are obtained in each control cycle. After a non-synchronized control section is entered and each set value (for the cam position, speed and acceleration) is obtained, they are set at the non-synchronization curve starting position for the next control cycle as Step S6 in the flowchart of FIG. 3 is carried out. The non-synchronized control based on the fifth-order curves is carried out until the main shaft position comes to be $x = x_3$ while the non-synchronization curve starting position is sequentially updated.

Thereafter, a controlled operation section and a non-controlled operation section are alternated. If a target value is changed in the middle, a calculation operation is carried out each time to connect the non-synchronization curve to the synchronization curve by a fifth-order curve, as shown in FIGS. 18-21.

Figure 18:
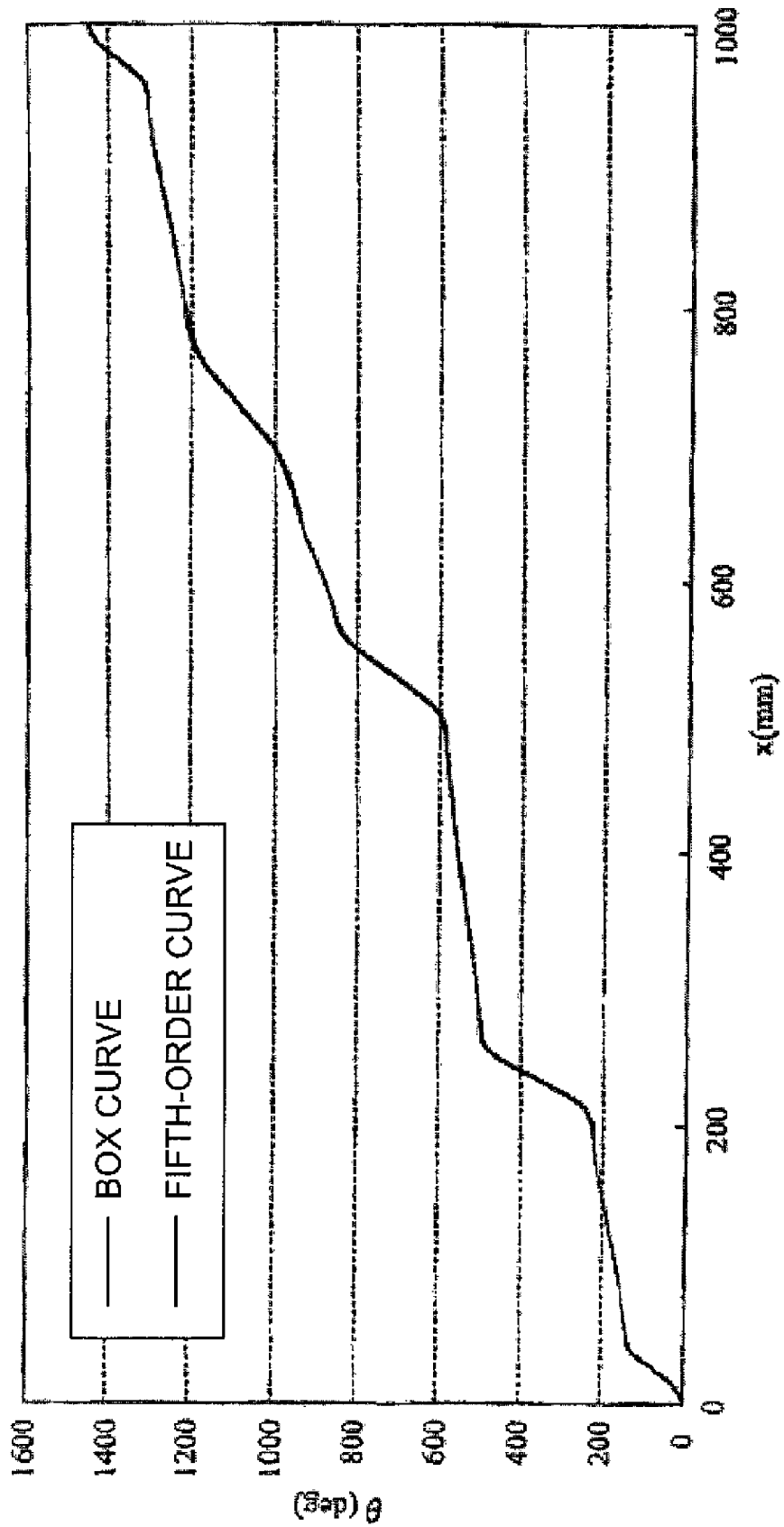
FIG. 18 is a drawing of synchronization and non-synchronization curves for showing the phase-position characteristic for an end sealing apparatus of the box motion type.
Figure 19:
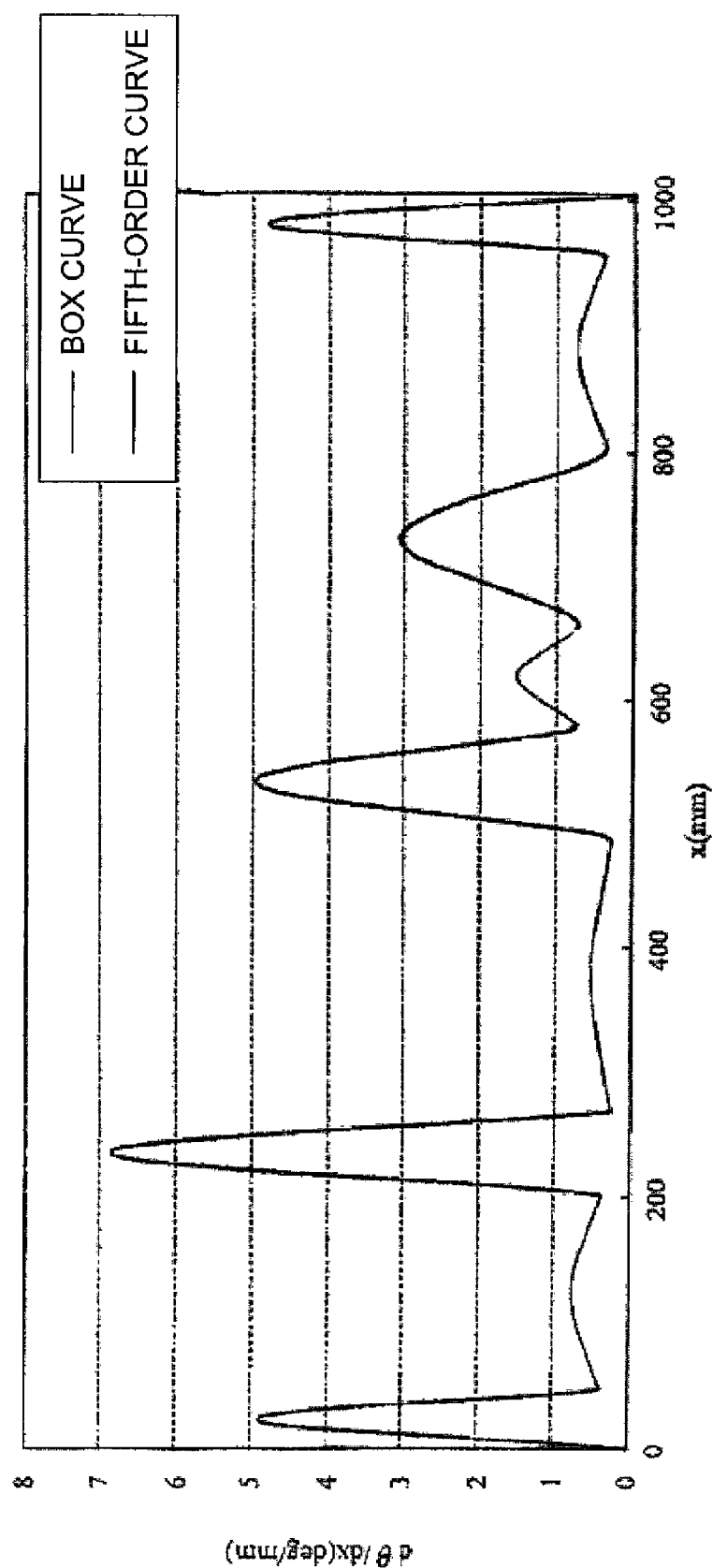
FIG. 19 is a drawing of synchronization and non-synchronization curves for showing the phase-speed characteristic for an end sealing apparatus of the box motion type.
Figure 20:
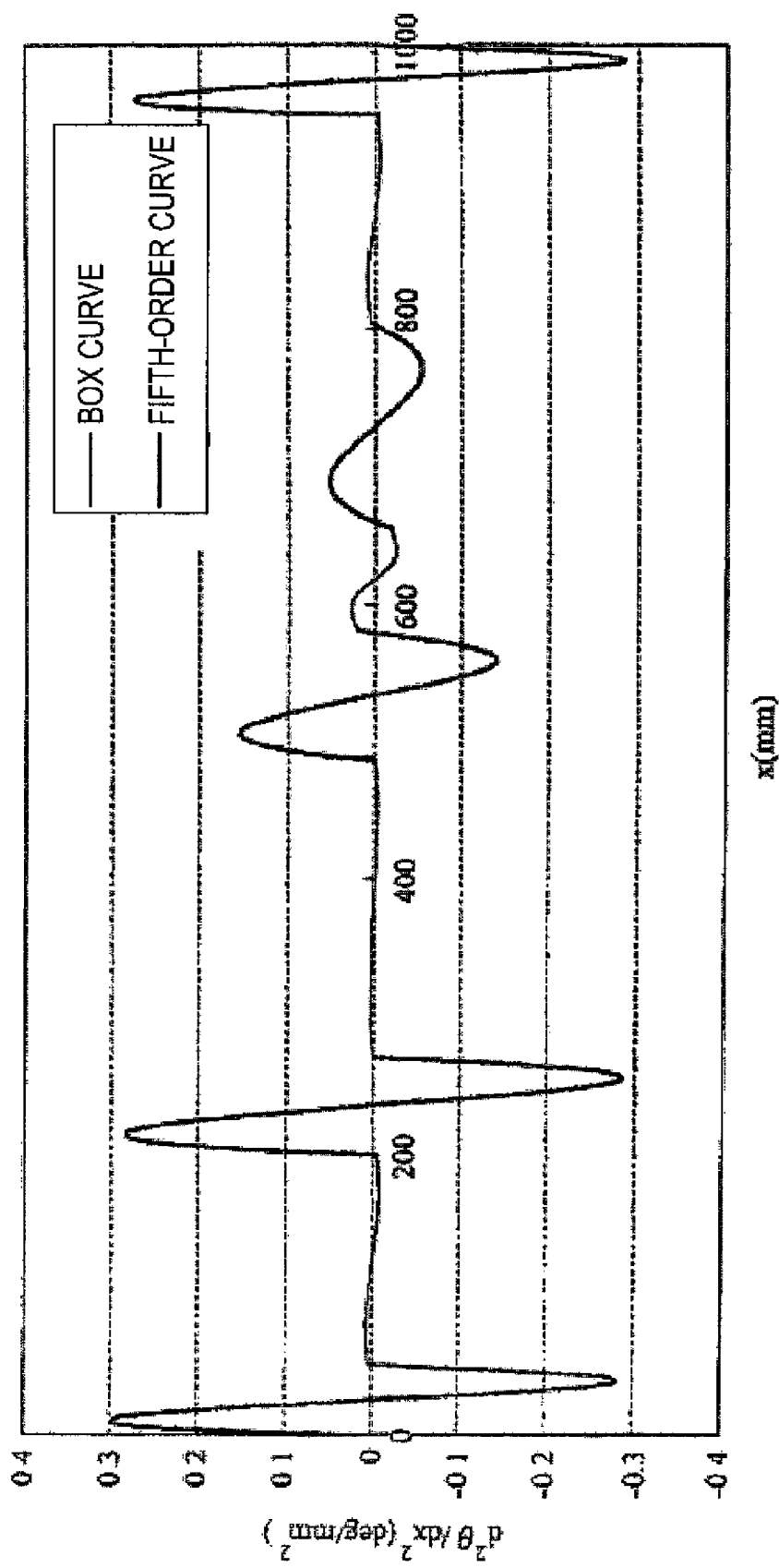
FIG. 20 is a drawing of synchronization and non-synchronization curves for showing the phase-acceleration characteristic for an end sealing apparatus of the box motion type.
Figure 21:
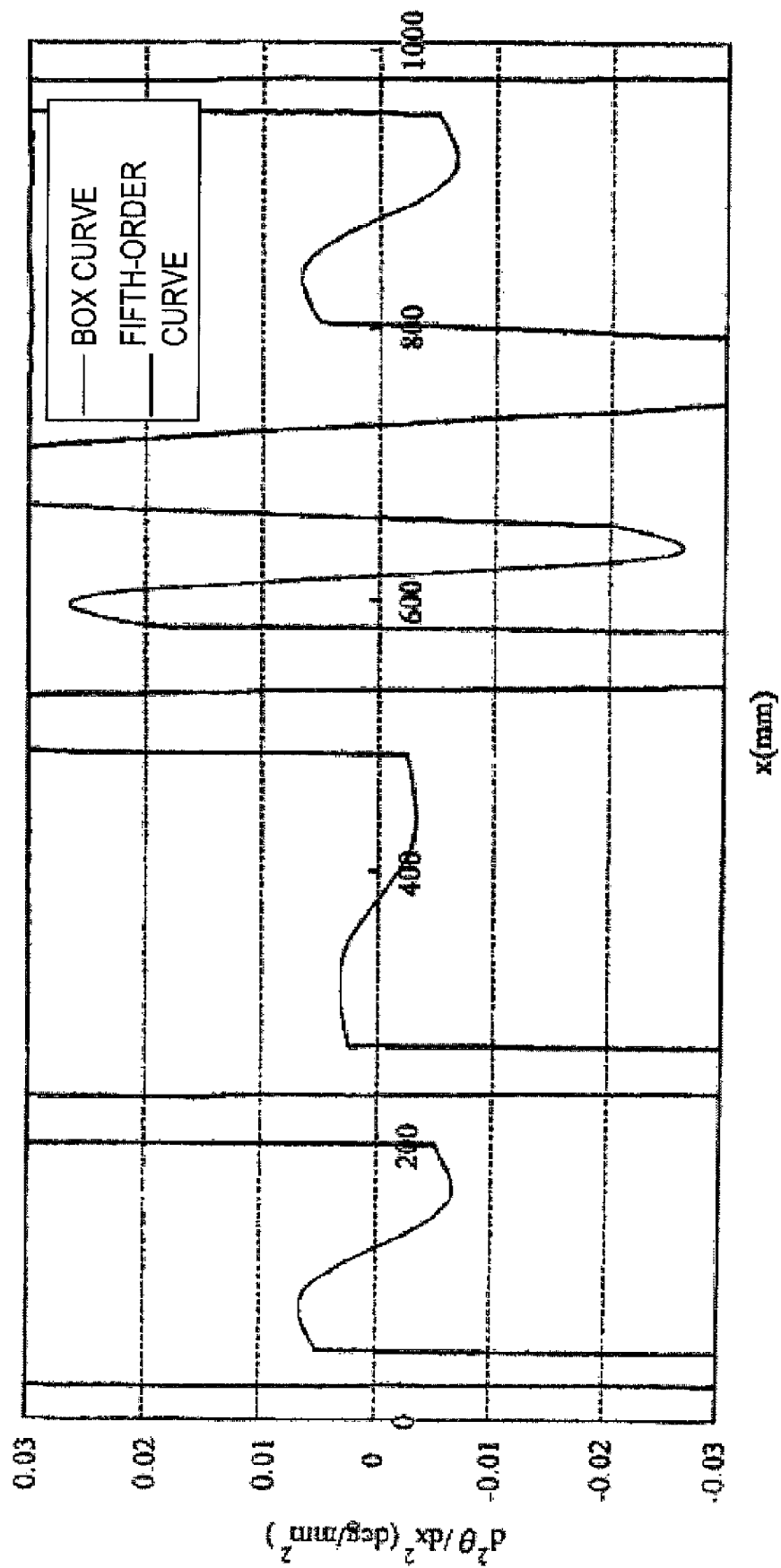
FIG. 21 is an enlarged drawing of synchronization and non-synchronization curves for showing the phase-acceleration characteristic for an end sealing apparatus of the box motion type.

Although the starting position for synchronization or the synchronization ratio for a box curve is changed as shown in FIG. 18, the speed is smoothly connected as shown in FIG. 19 and acceleration is also smoothly connected as shown in FIG. 20 and as can be ascertained in FIG. 21. This means that shocks and vibrations are not likely to result. Since the target position, speed and acceleration are set for the servo for the follower shaft for each control cycle, changes made on-line to the starting position of synchronization or the ratio can be easily dealt with.

Next, an end sealing apparatus of the crank motion type is explained with reference to FIG. 22 which schematically shows an end sealing apparatus adapted to transmit the rotary power of a servo motor serving as the third driver motor M3 to a rotary plate 7b (having the function of a crank arm) through a power transmitting means 7a such as a chain. A crank pin 7f is provided near the periphery of the rotary plate 7b and one end of a connecting bar 7g is rotatably connected to this crank pin 7f. Connected to the other end of the connecting bar 7g is a slider 7h adapted to undergo a reciprocating motion along a straight line inside guide rails 7i. Thus, as the third driver motor M3 rotates and the rotary plate 7b is thereby rotated, the slider 7h is caused to move repeatedly on a straight line by means of this crank mechanism. An end sealer is connected to this slider 7h so as to move vertically.

Figure 22:
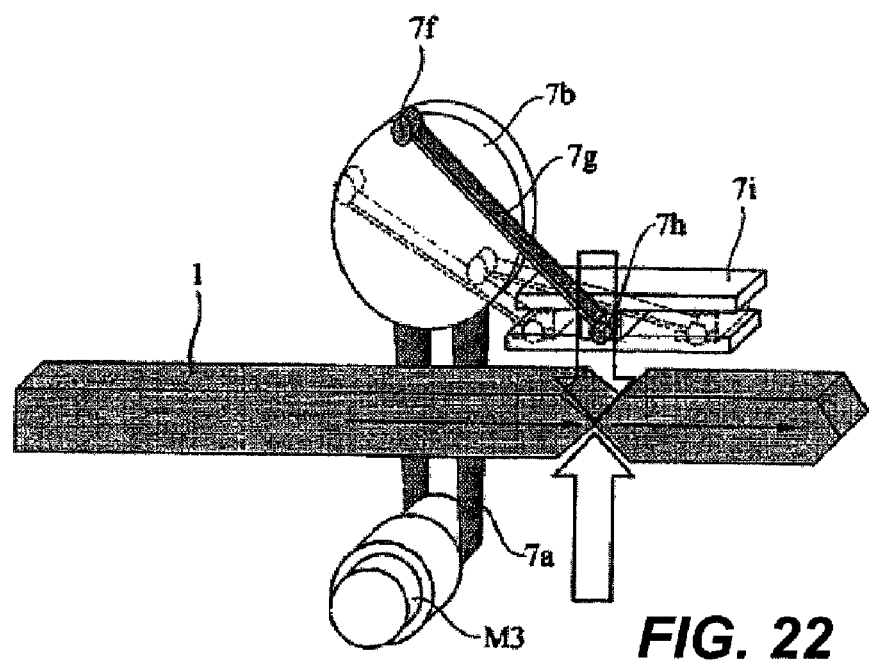
FIG. 22 is a schematic view of an end sealing apparatus of the crank motion type.

FIG. 22 shows only an upper mechanism above the packaging film 1. A similar mechanism is also provided below the packaging film 1, and the end sealers are caused to move upward and downward at a specified timing such that the packaging film 1 is sandwiched when the synchronization starting point is reached and is then caused to move forward while remaining sandwiched until the end sealers are separated at the synchronization ending point. The sealers are then moved forward or backward along specified trajectories and return to their original synchronization starting positions.

Thus, the rotational speed of the rotary plate 7b is controlled (synchronized control) such that the speed of the forward motion of the end sealer, or that of the slider 7h, will match the speed of transportation of the packaging film 1 when the end sealers are sandwiching the packaging film 1 and in the non-synchronized control section that the end sealers will reach their synchronization starting points as the next end-sealing position of the packaging film 1 reaches the synchronization starting point.

Figure 23:
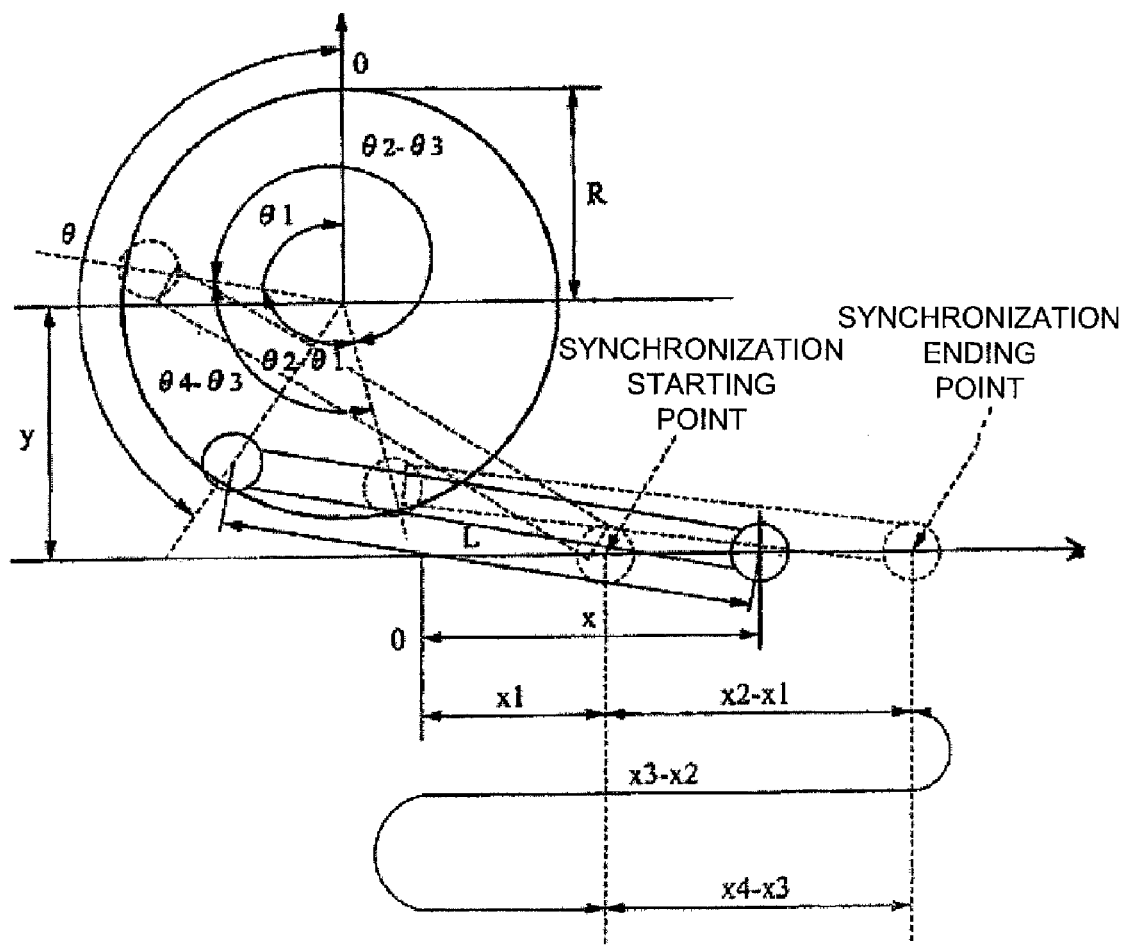
FIG. 23 is an abstracted drawing of a crank motion to show the relationship between the electronic cam and the packaging film.

FIG. 23 shows the mechanism of the crank motion in an abstract way, showing both the crank mechanism and the packaging film 1. As shown in FIG. 23, synchronization starts when the packaging film 1 is transported by the main shaft from the reference position (0 mm) to $x_1$, and synchronization ends when the main shaft position comes to be $x_2$. Thus, the distance traveled by the packaging film in the synchronized control section is $x_2 - x_1$. As for the follower shaft, the packaging process is considered to start from the reference position where the position of the electronic cam is 0°. During the first cycle of packaging process, synchronization starts at $\theta_1$ and the synchronized control is carried out until the time of reaching $\theta_2$. Thus, the synchronized control section corresponds to the angular range of $\theta_2 - \theta_1$.

This is followed by a non-synchronized control section. At the non-synchronization ending position (the starting position of the next synchronized control section), the main shaft position is $x_3$ and the cam position of the follower shaft is $\theta_3$. At the ending position of this synchronized control section (the starting position of the next non-synchronized control section), the main shaft position is $x_4$ and the cam position of the follower shaft is $\theta_4$.

The cam curves for the crank motion are as follows. The synchronized control section is when the main shaft x and the follower shaft $\theta$ are respectively in the range of $x_1 \leq x \leq x_2$ and $\theta_1 \leq \theta \leq \theta_2$. The synchronization curves of cam position $\theta$, cam speed $d\theta/dx$ and cam acceleration $d^2\theta/dx^2$ are as given below:

$$\beta = \frac{180}{\pi}\tan^{-1}\frac{y}{z};$$

$$\frac{d\beta}{dx} = -\frac{180by}{\pi(z^2 + y^2)};$$

$$\frac{d^2\beta}{dx^2} = \frac{360b^2 yz}{\pi(z^2 + y^2)^2};$$

Cam position (in clockwise direction)$\theta =$ $$\frac{180}{\pi}\left[\sin^{-1}\frac{L^2 - R^2 - z^2 - y^2}{2R\sqrt{z^2 + y^2}}\right] - \beta;$$

Cam position (in counter-clockwise direction)$\theta =$ $$\frac{180}{\pi}\left[\pi - \sin^{-1}\frac{L^2 - R^2 - z^2 - y^2}{2R\sqrt{z^2 + y^2}}\right] - \beta;$$

Cam speed $\frac{d\theta}{dx} = \frac{90b(R^2 - L^2 - y^2)z - z^3}{\pi R\sqrt{z^2 + y^2}\,(z^2 + y^2)\cos\{\frac{\pi}{180}(\theta + \beta)\}} - \frac{d\beta}{dx};$ Cam acceleration $\frac{d^2\theta}{dx^2} = \frac{90b^2\{(L^2 - R^2)(2z^2 - y^2) - y^2(z^2 + y^2)\}}{\pi R\sqrt{z^2 + y^2}\,(z^2 + y^2)^2\cos\{\frac{\pi}{180}(\theta + \beta)\}} +$ -continued
$$\frac{\pi}{180}\left(\frac{d\theta}{dx}+\frac{d\beta}{dx}\right)^2 \tan\left\{\frac{\pi}{180}(\theta+\beta)\right\} - \frac{d^2\beta}{dx^2}$$

where y, R and L are constants, $z=b(x-x_a)$, $x_a$ is a coefficient related to the movement in the forward-backward direction, b is a factor related to the change in the synchronization ratio.

In the subsequent synchronized control sections, positions, speeds and accelerations are set as follows for each control cycle of the controller based on the position of the main shaft and by using the formulas give above;

Main shaft acceleration=$d^2x/dt^2$;
Follower shaft position=Cam position $\theta$;
Follower shaft speed=$d\theta/dt=(d\theta/dx)(dx/dt)$; and
Follower shaft acceleration=$d^2\theta/dt^2=(d^2\theta/dt^2)(dx/dt)^2+(d\theta/dx)(d^2x/dt^2)$.

Figure 24:
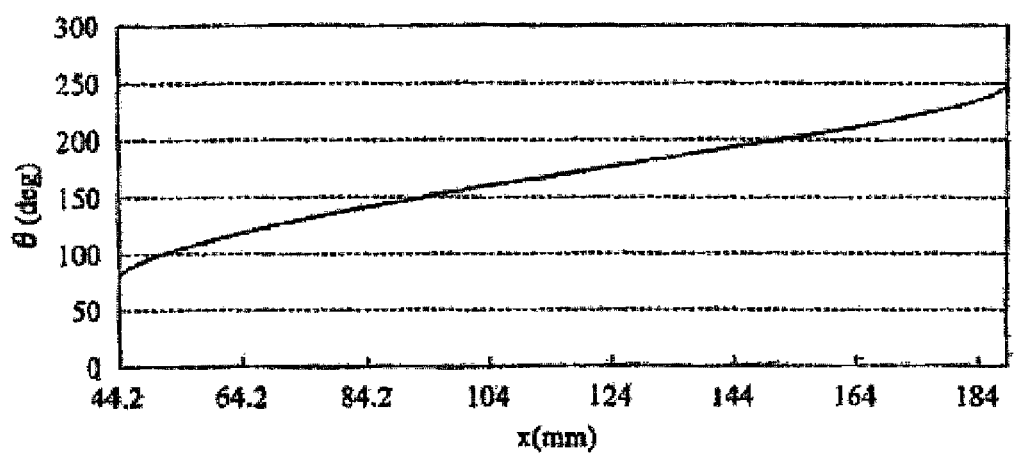
FIG. 24 is a drawing of a synchronization curve for showing the phase-position characteristic in a synchronized control section of a crank motion type.
Figure 25:
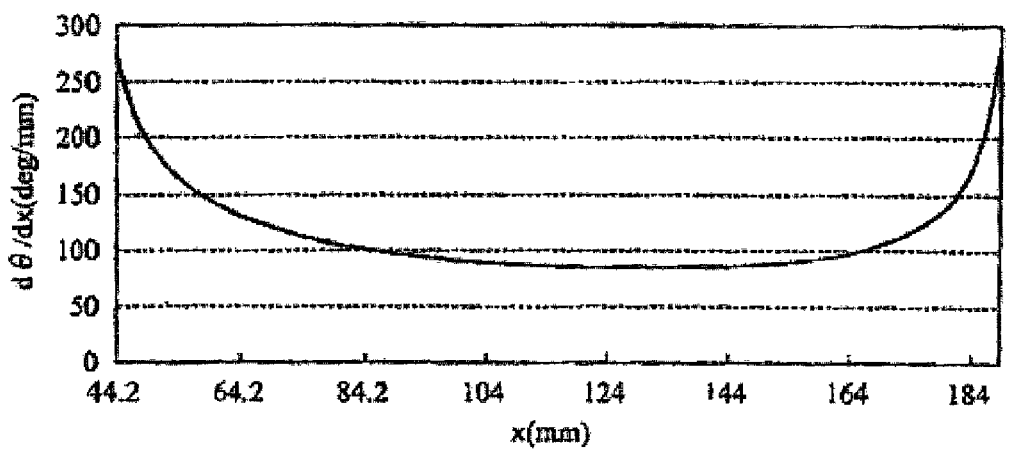
FIG. 25 is a drawing of a synchronization curve for showing the phase-speed characteristic in a synchronized control section of a crank motion type.
Figure 26:
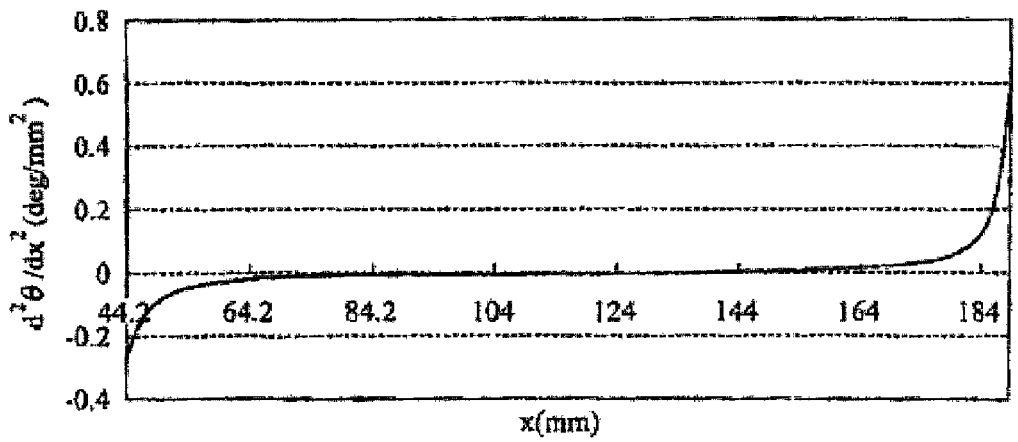
FIG. 26 is a drawing of a synchronization curve for showing the phase-acceleration characteristic in a synchronized control section of a crank motion type.

Examples of operation curves in a synchronized control section of a box motion based on the equations given above are shown in FIGS. 24-26 with real units with $x_0$=44.2 mm, $x_1$=200 mm, $\theta_0$=135 deg, $\theta_1$=225 deg, R=70 mm, y=70 mm and L=200 mm.

Next, the calculation of control curves for a non-synchronized control section is explained. At the non-synchronization starting position (the end position of cam synchronization curve in crank motion), the main shaft position is $x=x_2$ (mm). If the synchronization starting point is not displaced, the formulas that determine the synchronization curves described above are given as follows:

$$\beta = \frac{180}{\pi}\tan^{-1}\frac{y}{x};$$

$$\frac{d\beta}{dx} = -\frac{180y}{\pi(x^2+y^2)};$$

$$\frac{d^2\beta}{dx^2} = \frac{360yx}{\pi(x^2+y^2)^2};$$

Cam position (in clockwise direction) $\theta =$
$$\frac{180}{\pi}\left[\sin^{-1}\frac{L^2-R^2-x^2-y^2}{2R\sqrt{x^2+y^2}}\right] - \beta;$$

Cam position (in counter-clockwise direction) $\theta =$
$$\frac{180}{\pi}\left[\pi - \sin^{-1}\frac{L^2-R^2-x^2-y^2}{2R\sqrt{x^2+y^2}}\right] - \beta;$$

Cam speed $\frac{d\theta}{dx} = \frac{90(R^2-L^2-y^2)x-x^3}{\pi R\sqrt{x^2+y^2}\,(x^2+y^2)\cos\left\{\frac{\pi}{180}(\theta+\beta)\right\}} - \frac{d\beta}{dx};$ Cam acceleration $\frac{d^2\theta}{dx^2} = \frac{90\{(L^2-R^2)(2x^2-y^2)-y^2(x^2+y^2)\}}{\pi R\sqrt{x^2+y^2}\,(x^2+y^2)^2\cos\left\{\frac{\pi}{180}(\theta+\beta)\right\}} +$ $$\frac{\pi}{180}\left(\frac{d\theta}{dx}+\frac{d\beta}{dx}\right)^2 \tan\left\{\frac{\pi}{180}(\theta+\beta)\right\} - \frac{d^2\beta}{dx^2}$$

where y, R and L are constants.

If $x=x_2$ is substituted in these equations, the values of the cam position, speed and acceleration at the synchronization ending position are obtained as follows:

$$\beta = \frac{180}{\pi}\tan^{-1}\frac{y}{x_2};$$

$$\frac{d\beta}{dx} = -\frac{180y}{\pi(x_2^2+y^2)};$$

$$\frac{d^2\beta}{dx^2} = \frac{360yx_2}{\pi(x_2^2+y^2)^2};$$

Cam position (in clockwise direction)
$$\theta_2 = \frac{180}{\pi}\left[\sin^{-1}\frac{L^2-R^2-x_2^2-y^2}{2R\sqrt{x_2^2+y^2}}\right] - \beta;$$

Cam position (in counter-clockwise direction)
$$\theta_2 = \frac{180}{\pi}\left[\pi - \sin^{-1}\frac{L^2-R^2-x_2^2-y^2}{2R\sqrt{x_2^2+y^2}}\right] - \beta;$$

Cam speed
$$\omega = \omega_2 = \frac{d\theta}{dx}$$
$$= \frac{90(R^2-L^2-y^2)x_2-x_2^3}{\pi R\sqrt{x_2^2+y^2}\,(x_2^2+y^2)\cos\left\{\frac{\pi}{180}(\theta_2+\beta)\right\}} - \frac{d\beta}{dx};$$

Cam acceleration
$$\alpha = \alpha_2$$
$$= \frac{d^2\theta}{dx^2} = \frac{90\{(L^2-R^2)(2x_2^2-y^2)-y^2(x_2^2+y^2)\}}{\pi R\sqrt{x_2^2+y^2}\,(x_2^2+y^2)^2\cos\left\{\frac{\pi}{180}(\theta_2+\beta)\right\}} +$$
$$\frac{\pi}{180}\left(\frac{d\theta}{dx}+\frac{d\beta}{dx}\right)^2 \tan\left\{\frac{\pi}{180}(\theta_2+\beta)\right\} - \frac{d^2\beta}{dx^2}$$

where y, R and L are constants.

Thus, values $x_s=x_2$; $\theta_s=\theta_2$, $\omega_s=\omega_2$ and $\alpha_s=\alpha_2$ are taken in as previous cam values when the non-synchronization curves are obtained.

If there is no change in the target value, the next synchronized control section starts when the main shaft position becomes $x=x_3$ and the control is carried out according to the control curves while the main shaft position is in the interval between $x_3$ and $x_4$, or when $x_3 \leq x \leq x_4$. The cam position, speed and acceleration are controlled in this synchronized control period according to the synchronization curves given as follows:

$$\beta = \frac{180}{\pi}\tan^{-1}\frac{y}{x_3};$$

$$\frac{d\beta}{dx} = -\frac{180y}{\pi(x_3^2+y^2)};$$

$$\frac{d^2\beta}{dx^2} = \frac{360yx_3}{\pi(x_3^2+y^2)^2};$$

Cam position (in clockwise direction)
$$\theta_3 = \frac{180}{\pi}\left[\sin^{-1}\frac{L^2-R^2-x_3^2-y^2}{2R\sqrt{x_3^2+y^2}}\right] - \beta;$$

-continued

Cam position (in counter-clockwise direction)

$$\theta_3 = \frac{180}{\pi}\left[\pi - \sin^{-1}\frac{L^2 - R^2 - x_3^2 - y^2}{2R\sqrt{x_3^2 + y^2}}\right] - \beta;$$

Cam speed $$\omega = \omega_3 = \frac{d\theta}{dx}$$

$$= \frac{90(R^2 - L^2 - y^2)x_3 - x_3^3}{\pi R\sqrt{x_3^2 + y^2}\,(x_3^2 + y^2)\cos\left\{\frac{\pi}{180}(\theta_3 + \beta)\right\}} - \frac{d\beta}{dx};$$

Cam acceleration $$\alpha = \alpha_3$$

$$= \frac{d^2\theta}{dx^2} = \frac{90\{(L^2 - R^2)(2x_3^2 - y^2) - y^2(x_3^2 + y^2)\}}{\pi R\sqrt{x_3^2 + y^2}\,(x_3^2 + y^2)^2\cos\left\{\frac{\pi}{180}(\theta_3 + \beta)\right\}} +$$

$$\frac{\pi}{180}\left(\frac{d\theta}{dx} + \frac{d\beta}{dx}\right)^2 \tan\left\{\frac{\pi}{180}(\theta_3 + \beta)\right\} - \frac{d^2\beta}{dx^2}$$

where y, R and L are constants.

Values of the cam position, speed and acceleration at the starting position ($x=x_3$) of this synchronized control period can be obtained from the following:

$$\theta = A_5(x - x_s)^5 + A_4(x - x_s)^4 + A_3(x - x_s)^3 +$$
$$0.5\alpha_s(x - x_s)^2 + \omega_s(x - x_s) + \theta_s;$$

$$\frac{d\theta}{dx} = 5A_5(x - x_s)^4 + 4A_4(x - x_s)^3 +$$
$$3A_3(x - x_s)^2 + \alpha_s(x - x_s) + \omega_s;$$

$$\frac{d^2\theta}{dx^2} = 20A_5(x - x_s)^3 + 12A_4(x - x_s)^2 + 6A_3(x - x_s) + \alpha_s;$$

where $$A_5 = 6(\theta_e - \theta_s)/(x_e - x_s)^5 -$$
$$3(\omega_e - \omega_s)/(x_e - x_s)^4 + 0.5(\alpha_e - \alpha_s)/(x_e - x_s)^3;$$

$$A_4 = -15(\theta_e - \theta_s)/(x_e - x_s)^4 +$$
$$(7\omega_e + 8\omega_s)/(x_e - x_s)^3 + (1.5\alpha_e - \alpha_s)/(x_e - x_s)^2;$$

$$A_3 = 10(\theta_e - \theta_s)/(x_e - x_s)^3 -$$
$$2(2\omega_e + 3\omega_s)/(x_e - x_s)^2 + 0.5(\alpha_e - 3\alpha_s)/(x_e - x_s).$$

The values thus obtained become those of the end positions of the non-synchronized control section where the main shaft position is in the interval $x_2 \leq x \leq x_3$, that is, the target values of this non-synchronized control section. In other words, they are set as $x_e = x_3$, $\theta_e = \theta_3$, $\omega_3 = \omega_3$ and $\alpha_e = \alpha_3$ to the non-synchronization curves.

The values thus obtained become those of the end positions of the non-synchronized control period where the main shaft position is in the interval $x_2 \leq x \leq x_3$, that is, the target values of this non-synchronized control section. In other words, they are set as $x_e = x_3$, $\theta_e = \theta_3$, $\omega_e = \omega_3$ and $\alpha_e = \alpha_3$ to the non-synchronization curves.

Since the target value when the main shaft position is $x=x_2$ (or the main shaft position at the end position of the non-synchronized control section) is $x_e = x_3$, a fifth-order equation passing both these points is generated. When the current main shaft position x is such that $x_s \leq x \leq x_e$, or $x_2 \leq x \leq x_3$, fifth-order curves are obtained in each control cycle. After a non-synchronized region is entered and each set value (for the cam position, speed and acceleration) is obtained, they are set at the non-synchronization curve starting position for the next control cycle as Step S6 in the flowchart of FIG. 3 is carried out. The non-synchronized control based on the fifth-order curves is carried out until the main shaft position becomes $x=x_3$ while the non-synchronization curve starting position is sequentially updated.

Thereafter, a synchronized control section and a non-synchronized control section are alternates. If a target value is changed in the middle, a calculation operation is carried out each time to connect the non-synchronization curve is connected to the synchronization curve by a fifth-order curve, as shown in FIGS. 27-29.

Figure 27:
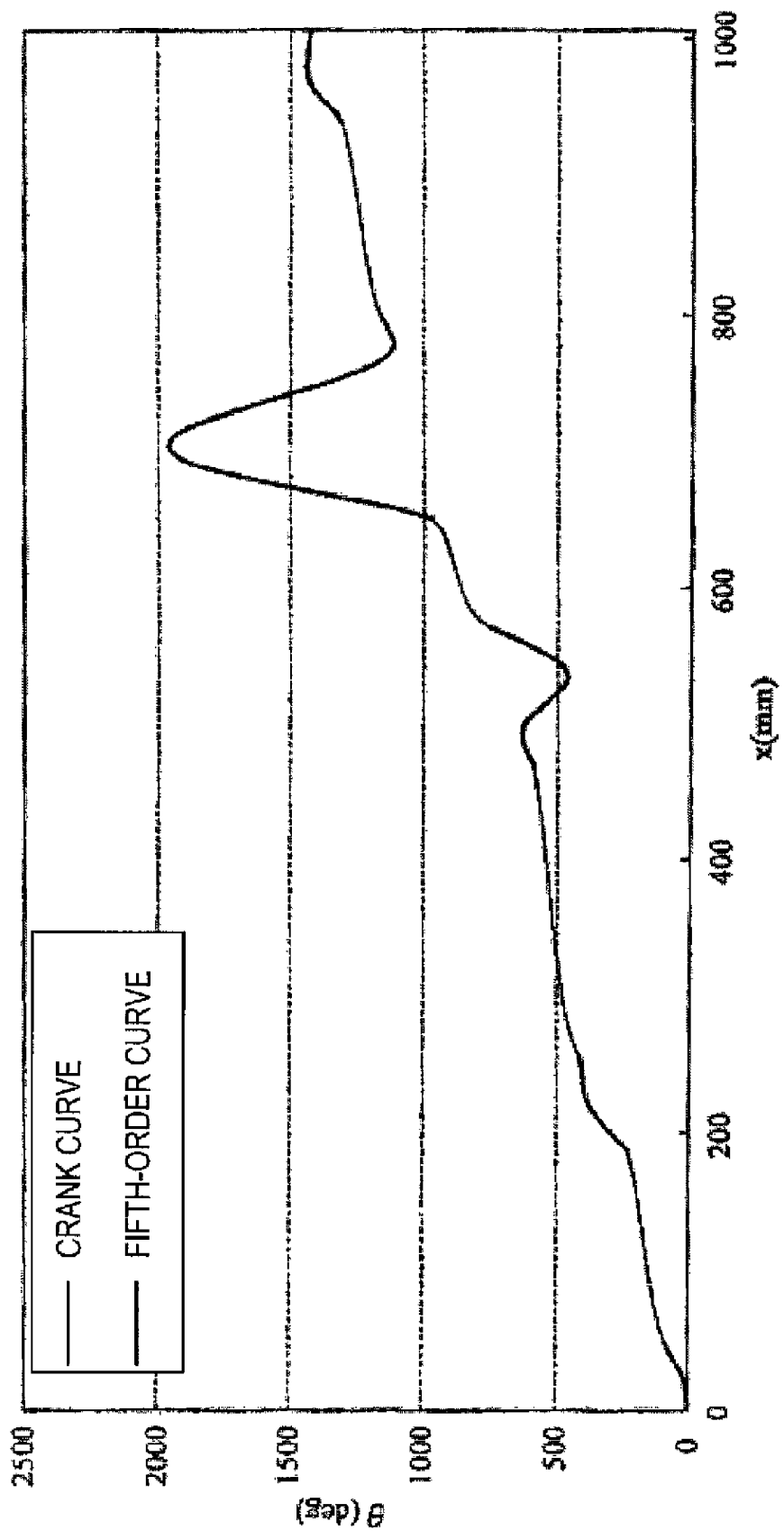
FIG. 27 is a drawing of synchronization and non-synchronization curves for showing the phase-position characteristic for an end sealing apparatus of the crank motion type.
Figure 28:
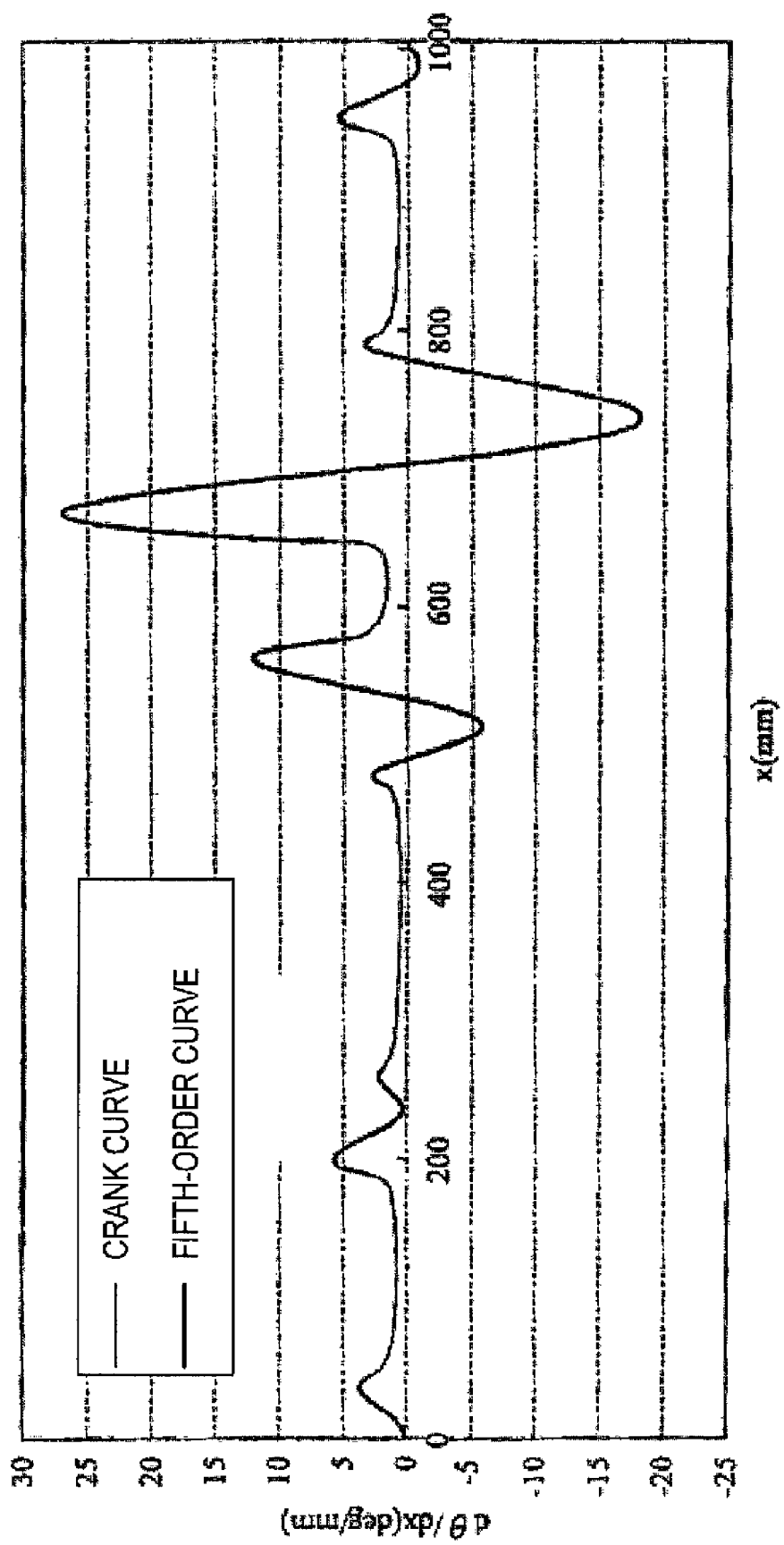
FIG. 28 is a drawing of synchronization and non-synchronization curves for showing the phase-speed characteristic for an end sealing apparatus of the crank motion type.
Figure 29:
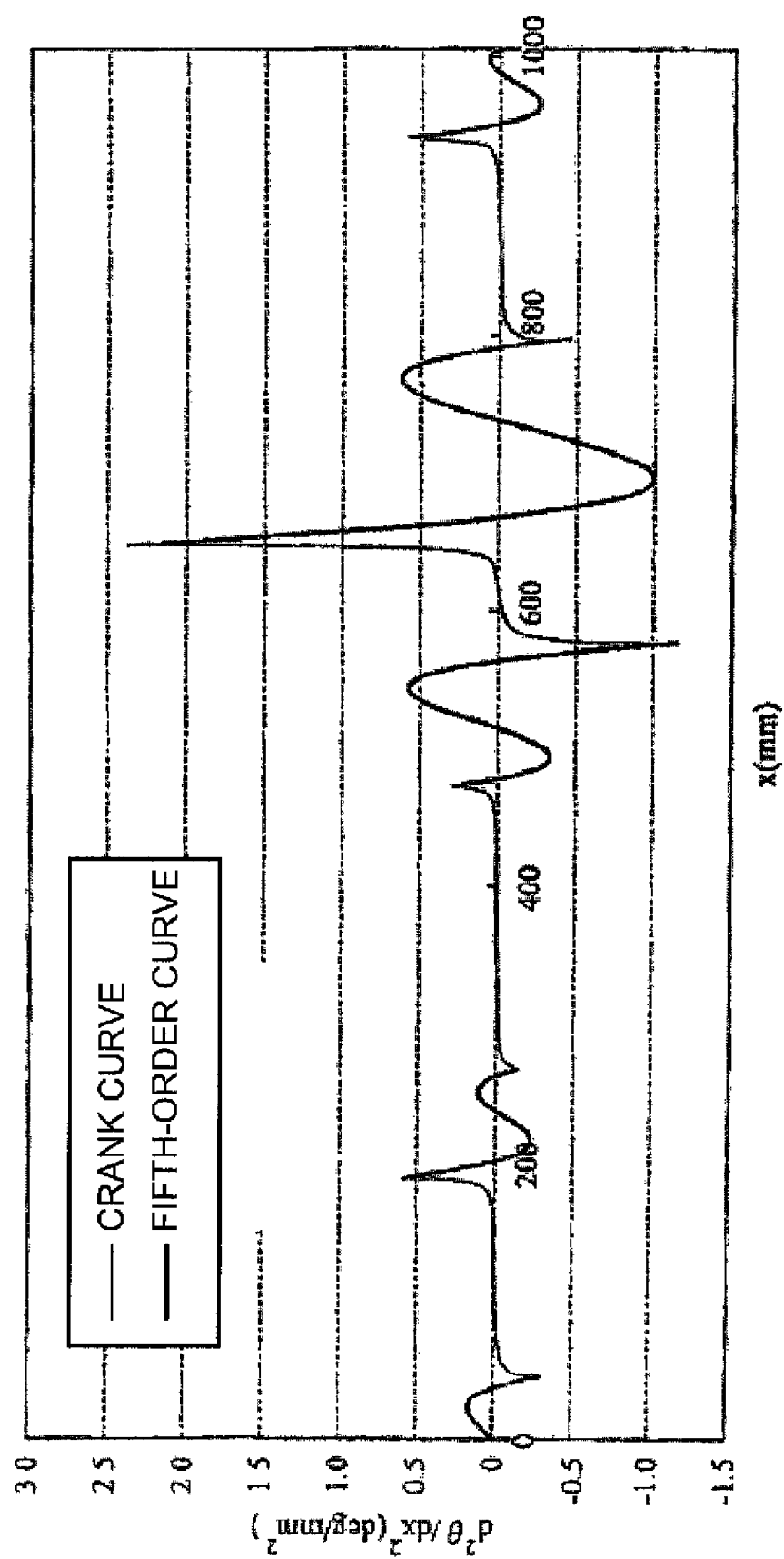
FIG. 29 is a drawing of synchronization and non-synchronization curves for showing the phase-acceleration characteristic for an end sealing apparatus of the crank motion type.

Although the starting position for synchronization or the synchronization ratio for a box curve is changed as shown in FIG. 18, the speed is smoothly connected as shown in FIG. 27 and acceleration is also smoothly connected as shown in FIG. 28 and as can be ascertained in FIG. 29. This means that shocks and vibrations are not likely to result. Since the target position, speed and acceleration are set for the servo for the follower shaft for each control cycle, changes made on-line to the starting position of synchronization or the ratio can be easily dealt with.

In the above, the invention was described as applied to a driving servo motor for an end sealing apparatus of a packaging machine but it goes without saying that it is not intended to limit the scope of the invention. The invention can be applied equally well to a driving servo motor for means for supplying articles to be packaged into a packaging film. Since the supply speed of articles to be packaged and the speed of transporting the packaging film are generally different, if the packaging film is being transported at a constant speed, the supply speed of the articles may be controlled so as to be matched to the speed of transportation of the packaging film only while the articles are being supplied into the packaging film. During the rest of time, it may be controlled in a non-synchronized way according to a specified non-synchronization curve such as a fifth-order curve.

The end sealing apparatus 7 may be of a so-called rotary motion type, having its end sealers directly or indirectly attached respectively to a pair of upper and lower rotary shafts such that the end sealers are rotated with the rotations of the rotary shafts so as to sandwich and cut the packaging film at a specified timing.

As explained above for end seal apparatus of the other types, let the positions of the main shaft and the follower shaft be indicated by $x_1$ and $\theta_1$ at the first synchronization starting position and $x_2$ and $\theta_2$ at the synchronization ending position (non-synchronization starting position). Similarly, let the positions of the main shaft and the follower shaft be indicated by $x_3$ and $\theta_3$ at the next synchronization starting position and $x_4$ and $\theta_4$ at the ending position of this (next) synchronized control section (non-synchronization starting position). It now goes without saying that $\theta_1 \leq \theta_2 \leq \theta_3 \leq \theta_4$ and that $x_1 \leq x_2 \leq x_3 \leq x_4$.

The synchronization curve is given as follows:

$$\theta - \theta_1 = \{(\theta_2 - \theta_1)/(x_2 - x_1)\}(x - x_1)$$

where $\theta$ is the position of the follower shaft and x is the position of the main shaft. The cam speed is obtained as follows by differentiating the synchronization curve by x:

$$\omega_1 = \omega_2 = d\theta/dx = (\theta_2 - \theta_1)/(x_2 - x_1).$$

The cam acceleration is zero.

The next synchronization curve is similarly given as follows:

$$\theta - \theta_3 = \{(\theta_4 - \theta_3)/(x_4 - x_3)\}(x - x_3).$$

The cam speed is obtained as follows by differentiating the synchronization curve by x:

$$\omega_3 = \omega_4 = (\theta_4 - \theta_3)/(x_4 - x_3).$$

The cam acceleration is again zero.

A non-synchronization curve is obtained by connecting the two synchronization curves by substituting the values obtained above ($x_s = x_2$, $x_e = x_3$, $\theta_s = \theta_2$ and $\theta_e = \theta_3$) into the equations shown above, or as follows:

$$\omega_s = \omega_2 = (\theta_2 - \theta_1)/(x_2 - x_1);$$

$$\omega_e = \omega_3 = (\theta_4 - \theta_3)/(x_4 - x_3);$$

$$\alpha_s = \alpha_e = 0.$$

Thus, a smooth waveform can be obtained. According to the example described above, since the earlier cam values are used for $x_s$, $\theta_s$, $\omega_s$ and $\alpha_s$, it is possible to connect the cam position, speed and acceleration although the next synchronization curve is modified.

Next a situation where the invention is applied to an synchronized operation using a ball screw and a rack-and-pinion will be considered, Let us consider a system having the servo motor of the follower shaft connected to a mechanical system with a ball screw or a rank-and-pinion placed parallel to the main shaft.

In this case, the distance of motion y in units of mm by the ball screw or the rack-and-pinion is given by $y = p\theta$ where $\theta$ is the position of the follower shaft, p in the case of a ball screw is equal to its pitch divided by 360 and in the case of a rack-and-pinion is equal to the radius of the pinion multiplied by ($\pi/360$). If the synchronization curve starting position and ending position of the follower shaft are respectively $\theta_1$ and $\theta_2$ and those of the main shaft are respectively $x_1$ and $x_2$, the synchronization curve is expressed as follows:

$$y - y_1 = \{(y_2 - y_1)/(x_2 - x_1)\}(x - x_1)$$

or $$\theta - \theta_1 = \{(\theta_2 - \theta_1)/(x_2 - x_1)\}(x - x_1)$$

where x is the position of the main shaft, $y_1 = p\theta_1$ and $y_2 = p\theta_2$.

If the equation of the synchronization curve is differentiated with respect to x, one obtains $d\theta/dx = (\theta_2 - \theta_1)/(x_2 - x_1)$. Or the cam speed is given as $\omega_1 = (\theta_2 - \theta_1)/(x_2 - x_1)$. If the equation is differentiated with respect to x twice, $d^2\theta/dx^2 = 0$, or the cam acceleration is zero. Thus, at the starting position of the follower shaft or at the non-synchronization curve starting position, the main shaft starting position is $x_0$, the follower position is $\theta_0$, the cam speed is $\omega_0 = 0$ and the cam acceleration is $\alpha_0 = 0$. At the non-synchronization curve ending position (synchronization curve starting position), the main shaft position is $x_1$, the follower shaft position is $\theta_1$, the cam speed is $\omega_1 = (\theta_2 - \theta_1)/(x_2 - x_1)$ and the cam acceleration is $\alpha_1 = 0$.

Substitutions are made as $x_s = x_0$, $x_e = x_1$, $\theta_s = \theta_0$, $\theta_e = \theta_1$, $\omega_s = \omega_0 = 0$, $\omega_e = \omega_1 = (\theta_2 - \theta_1)/(x_2 - x_1)$, $\alpha_s = 0$ and $\alpha_e = 0$ into the equation given above to generate the non-synchronization curve connecting between synchronization curves.

At the synchronization curve ending position (the non-synchronization curve starting position), the main shaft position is $x_2$, the follower shaft position is $=\theta_2$, the cam speed is $\omega_2 = (\theta_2 - \theta_1)/(x2 - x1)$ and the cam acceleration is 0. At the position where the follower shaft stops, or the non-synchronization curve ending position, the main shaft position is $x_3$, the follower shaft position is $\theta_3$ and the cam speed and acceleration $\alpha_0$ are 0.

The non-synchronization curve connecting between the synchronization curves can be generated similarly by substituting $x_s = x_2$, $x_e = x_3$, $\theta_s = \theta_2$, $\theta_e = \theta_3$, $\omega_s = \omega_2 = (\theta_2 - \theta_1)/(x_2 - x_1)$, $\omega_e = 0$, $\alpha_s = 0$ and $\alpha_e = 0$ into the equation given above.

Synchronized control may be effectively applied not only to a packaging machine but also to a printing machine having an object such as paper to be printed on and a roll with a printing surface operating in synchronism. There are situations where it is desired to correct the starting position for this operation for printing in the forward-backward direction. The non-synchronization control by means of fifth-order curves according to this invention can be applied in the correction process for carrying out a smooth correction.

Ball screws and rack-and-pinion devices must be stopped because they have ends on both sides. In this case, too, a smooth waveform can be obtained by using the present invention. Since the previous cam values can be substituted into $x_s$, $\theta_s$, $\omega_s$ and $\alpha_s$ by applying the example described above, it is possible to connect the cam position, speed and acceleration even if the synchronization curve is modified.

The present invention is applicable not only to a sealing apparatus but also to a single cutting apparatus. The object to be sealed or cut need not be a packaging film but may also be other objects in the shape of a sheet. The invention is also applicable to control methods and systems for an electronic cam using a servo motor, say, for cutting construction material, fabricating and inserting parts into electronic components or substrates being supplied in synchronism, cutting and fabricating glass, and fabricating and inserting components to automobiles on an assembly line. Smooth waveforms can be obtained in a synchronized control of plurality of shafts of a linear, horizontal, cylindrical or perpendicular robot by using the non-synchronized control of this invention for the operation of each shaft of the robot.

What is claimed is:

1. A servo motor control system provided with a synchronized control section where control is carried out for moving a follower shaft serving as a controlled object in synchronism with a main shaft position and a non-synchronized control section where control is carried out for moving said follower shaft from the ending position of said synchronized control section to the starting position of the next synchronized control section; said servo control system comprising:

a condition setting part for setting main shaft position, cam position, cam speed and cam acceleration corresponding to starting and ending positions of said non-synchronized control section;

a judging part for judging whether an obtained cam position is in said synchronized control section or in said non-synchronized control section;

a control curve generating part for generating a non-synchronization curve of a fifth order function of cam position corresponding to said main shaft position, a non-synchronization curve of a fourth order function of cam speed corresponding to said main shaft position and a non-synchronization curve of a third order function of cam acceleration corresponding to said main shaft position based on the cam position, the cam speed and the cam acceleration at the starting and ending positions of said non-synchronized control section if said judging part judges said obtained cam position to be in said non-synchronized control section; and a command setting part that generates and outputs output data for operating said servo motor based on each of the non-synchronization curves obtained by said control curve generating part and said obtained cam position;

wherein said control curve generating part serves, in said non-synchronized control section, to allow values of the main shaft position, the cam position, the cam speed and the cam acceleration at the ending position of said non-synchronized control section to be changed and to sequentially generate the non-synchronization curves based on said inputted values.

2. The servo motor control system of claim 1 wherein said control curve generating part is adapted to generate a non-synchronization curve for each control cycle of the non-synchronized control section by using the main shaft position, the cam position, the cam speed and the cam acceleration of the previous cycle as data on the starting position of said non-synchronization curve.

3. The servo motor control system of claim 2 further comprising a condition setting part for setting a specified middle passing point in said non-synchronized control section, wherein said control curve generating part obtains said fifth-order function so as to pass through a cam position of a specified middle point set by said condition setting part with respect to the main shaft position when said non-synchronization curve is generated in said non-synchronized control section and generates said third-order function such that the cam acceleration at said specified middle passing point approaches zero.

4. The servo motor control system of claim 3 wherein said control curve generating part is adapted to generate a synchronization curve that is set on the basis of a box motion curve or a crank motion curve in said synchronized control section.

5. The servo motor control system of claim 2 wherein said control curve generating part is adapted to generate a synchronization curve that is set on the basis of a box motion curve or a crank motion curve in said synchronized control section.

6. The servo motor control system of claim 1 further comprising a condition setting part for setting a specified middle passing point in said non-synchronized control section, wherein said control curve generating part obtains said fifth-order function so as to pass through a cam position of a specified middle point set by said condition setting part with respect to the main shaft position when said non-synchronization curve is generated in said non-synchronized control section and generates said third-order function such that the cam acceleration at said specified middle passing point approaches zero.

7. The servo motor control system of claim 6 wherein said control curve generating part is adapted to generate a synchronization curve that is set on the basis of a box motion curve or a crank motion curve in said synchronized control section.

8. The servo motor control system of claim 1 wherein said control curve generating part is adapted to generate a synchronization curve that is set on the basis of a box motion curve or a crank motion curve in said synchronized control section.

* * * * *